(12) United States Patent  
Kung et al.

(10) Patent No.: US 9,081,431 B2  
(45) Date of Patent: Jul. 14, 2015

(54) TOUCH PANEL

(71) Applicant: Industrial Technology Research Institute, Hsinchu (TW)

(72) Inventors: Chen-Pang Kung, Taoyuan County (TW); Pi-Hsien Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 197 days.

(21) Appl. No.: 13/721,039

(22) Filed: Dec. 20, 2012

(65) Prior Publication Data

US 2014/0071065 A1    Mar. 13, 2014

(30) Foreign Application Priority Data

Sep. 7, 2012   (TW) .............................. 101132853 A

(51) Int. Cl.
*G06F 3/041* (2006.01)
*G06F 3/044* (2006.01)

(52) U.S. Cl.
CPC ................ *G06F 3/041* (2013.01); *G06F 3/044* (2013.01)

(58) Field of Classification Search
CPC .......... G06F 2203/04111; G06F 3/041; G06F 3/0416; G06F 3/044; H03K 2017/9602; H03K 17/962
USPC .................................................. 345/173–174
See application file for complete search history.

(56) References Cited

U.S. PATENT DOCUMENTS

| 7,965,835 | B2 | 6/2011 | Park et al. |
| 8,159,466 | B2 | 4/2012 | Ma et al. |

| 2010/0317409 | A1 | 12/2010 | Jiang et al. |
| 2011/0210937 | A1 | 9/2011 | Kee et al. |
| 2012/0162096 | A1* | 6/2012 | Lin et al. ........................ 345/173 |

(Continued)

FOREIGN PATENT DOCUMENTS

| CN | 102253783 | 11/2011 |
| TW | 200903309 | 1/2009 |

(Continued)

OTHER PUBLICATIONS

Ujiie et al., "Haptic Device Using Flexible Sheet by Tension and Touch Area Control," IEEE/SICE International Symposium on System Integration (SII), Dec. 21-22, 2010, pp. 396-401.

(Continued)

*Primary Examiner* — Alexander Eisen
*Assistant Examiner* — Abhishek Sarma
(74) *Attorney, Agent, or Firm* — Jianq Chyun IP Office

(57) ABSTRACT

A touch panel connected to a control circuit and includes a substrate, at least one first sensing series, at least one second sensing series, and at least one third sensing series. The substrate has at least one first sensing region and at least one second sensing region alternatively arranged in a first direction. Each first sensing series extends along the first direction and includes at least one first-first sensing portion located in the first sensing region and at least one second-first sensing portion located in the second sensing region. A pattern or material of the second-first sensing portion is different from that of the first-first sensing portions. Each second sensing series extends along a second direction intersecting with the first direction and is intersected with the first-first sensing portion. Each third sensing series extends in the second direction and is intersected with the second-first sensing portion.

48 Claims, 17 Drawing Sheets

(56) References Cited

U.S. PATENT DOCUMENTS

2012/0169626 A1* 7/2012 Hsieh .................. 345/173
2013/0057488 A1* 3/2013 Xie et al. .............. 345/173

FOREIGN PATENT DOCUMENTS

| TW | 200947289 | 11/2009 |
| --- | --- | --- |
| TW | 201112066 | 4/2011 |
| TW | 201203043 | 1/2012 |
| TW | 201227452 | 7/2012 |
| TW | 201227467 | 7/2012 |

OTHER PUBLICATIONS

Lee et al., "Analysis of Thermo-Mechanical Behavior of ITO Layer on PET Substrate," Electronic Components and Technology Conference, May 31-Jun. 3, 2011, pp. 1796-1799.

Hamasha et al., "Stability of ITO Thin Film on Flexible Substrate Under Thermal Aging and Thermal Cycling Conditions," Journal of Display Technology 8 (7), Jul. 2012, pp. 385-390.

Chiu et al., "Multi-touch Document Folding: Gesture Models, Fold Directions and Symmetries," Proceedings of the SIGCHI Conference on Human Factors in Computing Systems , May 7-12, 2011, pp. 1591-1600.

Kim et al., "Deformable single wall carbon nanotube electrode for transparent tactile touch screen," Electronics Letters 47 (2), Jan. 20, 2011, pp. 1-2.

Asano et al., "Flexible Transparent Touch Panel Mounted on Round Surface," IEEE 25th International Conference on Micro Electro Mechanical Systems (MEMS), Jan. 29-Feb. 2, 2012, pp. 567-570.

Office Action of Taiwan Counterpart Application, issued on Sep. 10, 2014, p. 1-p. 9, in which the listed references were cited.

* cited by examiner

TOUCH PANEL

CROSS-REFERENCE TO RELATED APPLICATION

This application claims the priority benefit of Taiwan application Ser. No. 101132853, filed on Sep. 7, 2012. The entirety of the above-mentioned patent application is hereby incorporated by reference herein and made a part of this specification.

TECHNICAL FIELD

The technical field relates to an input device, and more particularly to, a touch panel.

BACKGROUND

In order to be more convenient, lightweight, smaller in volume, and more humane, input methods of many information products have transformed from traditional devices, such as keyboard or mouse, to touch devices. The touch devices may be assembled on a variety of flat panel displays, so that the flat panel displays may have both the functionalities of displaying image and inputting operational information.

In terms of the conventional touch devices, a capacitive touch panel and a resistive touch panel are the most common. The capacitive touch panel may be manufactured by adopting a monolayer substrate, which is quit helpful in regards to a product thinning. Moreover, users may perform touch control operations by just gently touching a surface of the capacitive touch panel, thereby providing the capacitive touch panel with even more attention.

SUMMARY

One of exemplary embodiments provides a touch panel having at least two sensing electrode pattern designs for enabling a specific sensing region to have enhanced bending endurance.

One of exemplary embodiments provides a touch panel having at least two sensing electrode material designs for enabling a specific sensing region to have enhanced bending endurance.

One of exemplary embodiments provides a touch panel having at least two sensing electrode laminating layer designs for enabling a specific sensing region to have enhanced bending endurance.

One of exemplary embodiments provides a touch panel including a substrate, at least one first sensing series, at least one second sensing series and at least one third sensing series. The substrate has at least one first sensing region and at least one second sensing region. The first sensing region and the at least one second sensing region are alternatively arranged in a first direction. The first sensing series are disposed on the substrate. Each first sensing series extends along the first direction and includes at least one first-first sensing portion located in the first sensing region and at least one second-first sensing portion located in the second sensing region. The second sensing series are disposed on the substrate. Each second sensing series extends along a second direction and includes a first-second sensing portion located in the first sensing region, wherein the second sensing series and the first sensing series are not electrically connected. The third sensing series are disposed on the substrate. Each third sensing series extends along the second direction and includes a second-second sensing portion located in the second sensing region. The third sensing series and the first sensing series are not electrically connected, and a pattern of the first-first sensing portion is different from a pattern of the second-first sensing portion.

One of exemplary embodiments provides a touch panel including a substrate, at least one first sensing series, at least one second sensing series and at least one third sensing series. The substrate has at least one first sensing region and at least one second sensing region. The first sensing region is adjacent to the at least one second sensing region in a first direction. The first sensing series are disposed on the substrate. Each first sensing series extends along the first direction and includes at least one first-first sensing portion located in the first sensing region and at least one second-first sensing portion located in the second sensing region. The second sensing series are disposed on the substrate. Each second sensing series extends along a second direction and includes a first-second sensing portion located in the first sensing region, wherein the second sensing series and the first sensing series are not electrically connected. The third sensing series are disposed on the substrate. Each third sensing series extends along the second direction and includes a second-second sensing portion located in the second sensing region. The third sensing series and the first sensing series are not electrically connected. A material of at least one of the first-first sensing portion and the first-second sensing portion is different from a material of at least one of the second-first sensing portion and the second-second sensing portion.

One of exemplary embodiments provides a touch panel including a substrate, at least one first sensing series, at least one second sensing series and at least one third sensing series. The substrate has at least one first sensing region and at least one second sensing region. The first sensing region is adjacent to the at least one second sensing region in a first direction. The first sensing series are disposed on the substrate. Each first sensing series extends along the first direction and includes at least one first-first sensing portion located in the first sensing region and at least one second-first sensing portion located in the second sensing region. The second sensing series are disposed on the substrate. Each second sensing series extends along a second direction and includes a first-second sensing portion located in the first sensing region, wherein the second sensing series and the first sensing series are not electrically connected. The third sensing series are disposed on the substrate. Each third sensing series extends along the second direction and includes a second-second sensing portion located in the second sensing region. The third sensing series and the first sensing series are not electrically connected. A laminated layer number of at least one of the first-first sensing portion and the first-second sensing portion is different from a laminated layer number of at least one of the second-first sensing portion and the second-second sensing portion.

The touch panel of the exemplary embodiments includes sensing electrodes disposed in different sensing regions, wherein between the different sensing electrodes, there are different patterns, materials or number of laminated layers. At least one sensing region of the touch panel, as compared to the other sensing regions, has a better bending endurance, and is suitable to be applied to flexible products. In other words, the touch panel of the exemplary embodiments, being applied to the flexible products, may reduce an occurrence of damaging the sensing electrodes due to bending.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Several exemplary embodiments accompanied with figures are described in detail below to further describe the disclosure in details.

Figure 1:
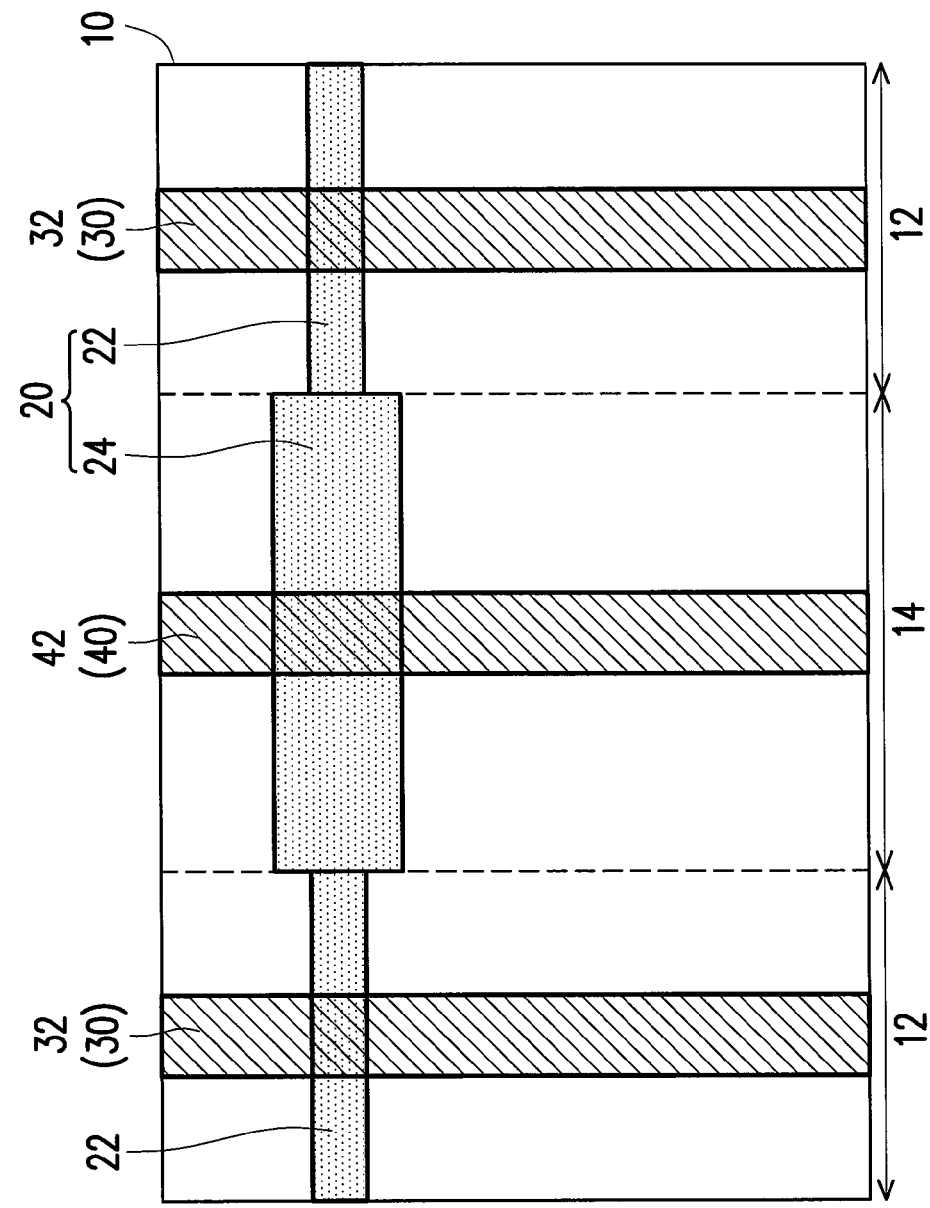
FIG. 1 is a schematic diagram illustrating a touch panel according to an embodiment.

FIG. 1 is a schematic diagram illustrating a touch panel according to an embodiment. Referring to FIG. 1, the touch panel 1 includes a substrate 10, at least one first sensing series 20, at least one second sensing series 30 and at least one third sensing series 40. The substrate 10 has at least one first sensing region 12 and at least one second sensing region 14, and the first sensing region 12 and the second sensing region 14 are alternatively arranged in a first direction D1. The at least one first sensing series 20, the at least one second sensing series 30 and the at least one third sensing series 40 are all disposed on the substrate 10.

Each first sensing series 20 herein, for example, extends along the first direction D1 and includes at least one first-first sensing portion 22 located in the first sensing region 12 and at least one second-first sensing portion 24 located in the second sensing region 14, wherein a pattern (minimum linewidth) of the second-first sensing portion 24 is, for example, different from a pattern (minimum linewidth) of the first-first sensing portion 22. The first-first sensing portion 22 and the second-first sensing portion 24 adjacent thereto may be electrically connected in series along the first direction D1 to constitute the continuous first sensing series 20. Herein, the so-called $i_{th}$-$j_{th}$ sensing portion is substantially referring to a sensing portion in the $i_{th}$ sensing region which extends along the $j_{th}$ direction.

There are two first sensing regions 12 illustrated in FIG. 1, and therefore each first sensing series 20 may include two first-first sensing portions 22; but the present embodiment is not limited thereto. When an amount of the second sensing region 14 is two and an amount of the first sensing region 12 is three, the first sensing series 20 may includes three first-first sensing portions 22 and two second-first sensing portions 24. Moreover, the minimum linewidth herein refers to a width measured along a direction (second direction D2) perpendicular to the extending direction of the first sensing series 20.

The second sensing series 30 are located in the first sensing region 12. Each second sensing series 30 extends along the second direction D2 and includes a first-second sensing portion 32 located in the first sensing region 12, wherein the second sensing series 30 and the first sensing series 20 are intersected with each other, but the second sensing series 30 and the first sensing series 20 are not electrically connected.

The third sensing series 40 are located in the second sensing region 14. Each third sensing series 40 extends along the second direction D2 and includes a second-second sensing portion 42 located in the second sensing region 14, wherein the third sensing series 40 and the first sensing series 20 are intersected with each other, but the third sensing series 40 and the first sensing series 20 are not electrically connected.

In the present embodiment, the first sensing regions 12 and the second sensing region 14 are alternatively arranged along the first direction D1, and the first-first sensing portions 22 of the first sensing series 20 located in the first sensing regions 12 have a linewidth design different from that of the second-first sensing portions 24 located in the second sensing region 14. The first sensing regions 12 and the second sensing region 14 may have different tolerabilities against an external force. If a linewidth of the second-first sensing portions 24 is greater than a linewidth of the first-first sensing portions 22, the second sensing region 14 may have larger external force tolerability, and may be configured as a predetermined region for bearing larger external stress. In present embodiment, the touch panel 1 may have an ideal quality and a prolonged service life.

Moreover, when the second sensing region 14 is configured to be the predetermined region for bearing larger external stress, the third sensing series 40 located in the second sensing region 14 may also have an enlarged linewidth design. In other words, in an embodiment, such as a touch panel 2 shown in FIG. 2, a second-second sensing portion 42A of a third sensing series 40A may have a linewidth design larger than the second-second sensing portion 42A of the third sensing series 40 in FIG. 1. The linewidths of the second-second sensing portion 42 and the second-second sensing portion 42A may be widths measured along a direction (first direction D1) perpendicular to the extending direction of the second sensing series 40 and 40A.

In addition, apart from having different linewidth designs, the sensing series of the touch panel 1 and the touch panel 2 in the first sensing regions 12 may have the same or a different material as the sensing series in the second sensing region 14. For example, a material of the first-first sensing portions 22 and a material of the second-first sensing portions 24 may be different or the same. A material of the first-second sensing portion 32 and a material of the second-second sensing portions 42, 42A may be identical to each other or different. The second-first sensing portions 24 and the second-second sensing portions 42, 42A which are all located in the second sensing region 14 may have the same material, and certainly may also have different materials.

The materials of the first-first sensing portions 22, the second-first sensing portions 24, the first-second sensing portion 32 and the second-second sensing portions 42, 42A include an organic conductive material, an inorganic conductive material or a combination thereof. Herein, the inorganic conductive material includes a metal oxide or a metal, and the inorganic conductive material includes a sheet structure, a line structure, a rod-like structure, a reticular structure or a granular structure. The organic conductive material includes a conductive polymer, a nano carbon material or a grapheme, and the organic conductive material includes a sheet structure, line structure, a rod-like structure, a reticular structure or a granular structure.

According to the above designs, the touch panel 1 and the touch panel 2 may have the second sensing region 14 with larger external force tolerability. Therefore, when the substrate 10 is a flexible substrate, the second sensing region 14 may be regarded as a region predetermined to be bended. In other words, when the substrate 10 is in a bending state while a bending axial direction thereof is parallel to the second direction D2 or intersected with the first direction D1, a radius of curvature of the second sensing region 14 may be smaller than a radius of curvature of the first sensing regions 12. As a result, when the substrate 10 is bended, elements in the second sensing region 14 would not be easily damaged due to bending stress, and it is helpful in enhancing the service lives of the touch panel 1 and the touch panel 2.

Figure 2:
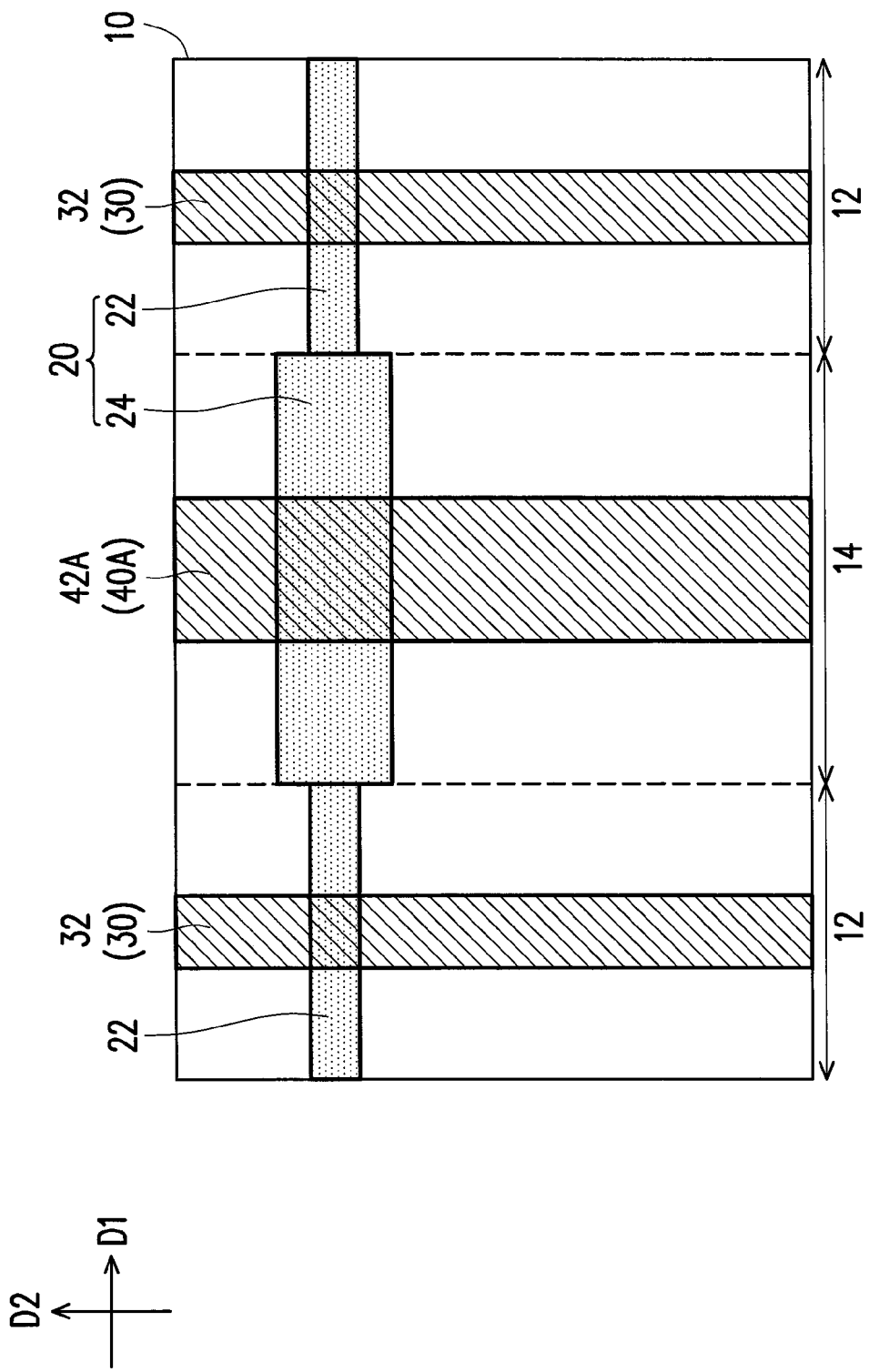
FIG. 2 is a schematic diagram illustrating a touch panel according to an embodiment.
Figure 3:
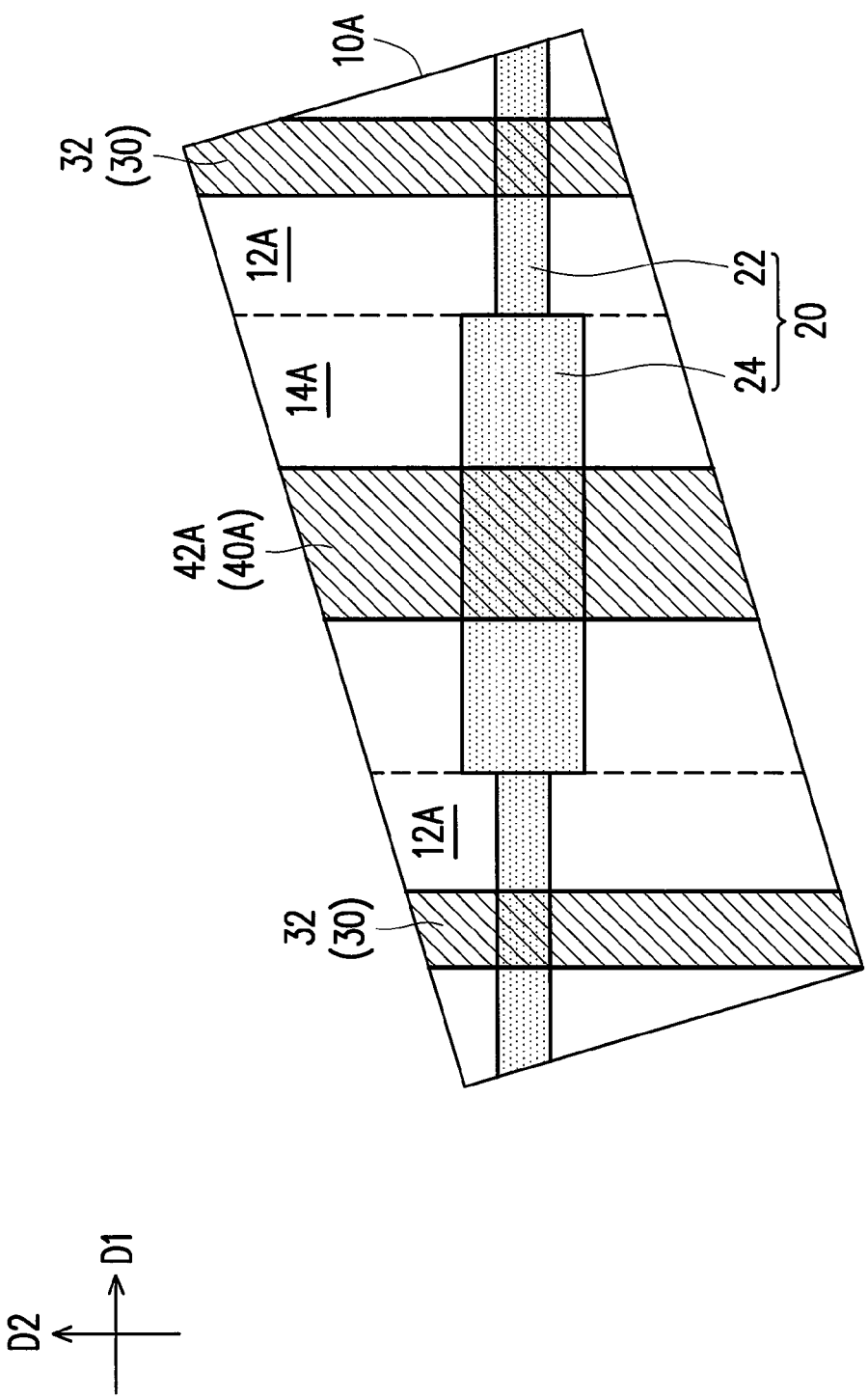
FIG. 3 is a schematic diagram illustrating a touch panel according to an embodiment.

FIG. 3 is a schematic diagram illustrating a touch panel according to an embodiment. Referring to FIG. 3, a touch panel 3 includes a substrate 10A, at least one first sensing series 20, at least one second sensing series 30 and at least one third sensing series 40A. Designs of the first sensing series 20, the second sensing series 30 and the third sensing series 40A are substantially similar to that of the first sensing series 20, the second sensing series 30 and the third sensing series 40A in FIG. 2, and thus are not repeated herein. Differences between the present embodiment and the embodiment illustrated in FIG. 2 are that, a length and a width of the substrate 10A are not parallel to the first direction D1 and the second direction D2. In other words, in the touch panel 2 illustrated in FIG. 2, a length and a width of substrate 10 are respectively parallel to the first direction D1 and the second direction D2, but the present embodiment is not. In the present embodiment, first sensing regions 12A and a second sensing region 14A are still alternatively arranged along the first direction D1, but an intersection of the first sensing region 12A and the second sensing region 14A does not have to be perpendicular to the length of the substrate 10A.

Figure 4:
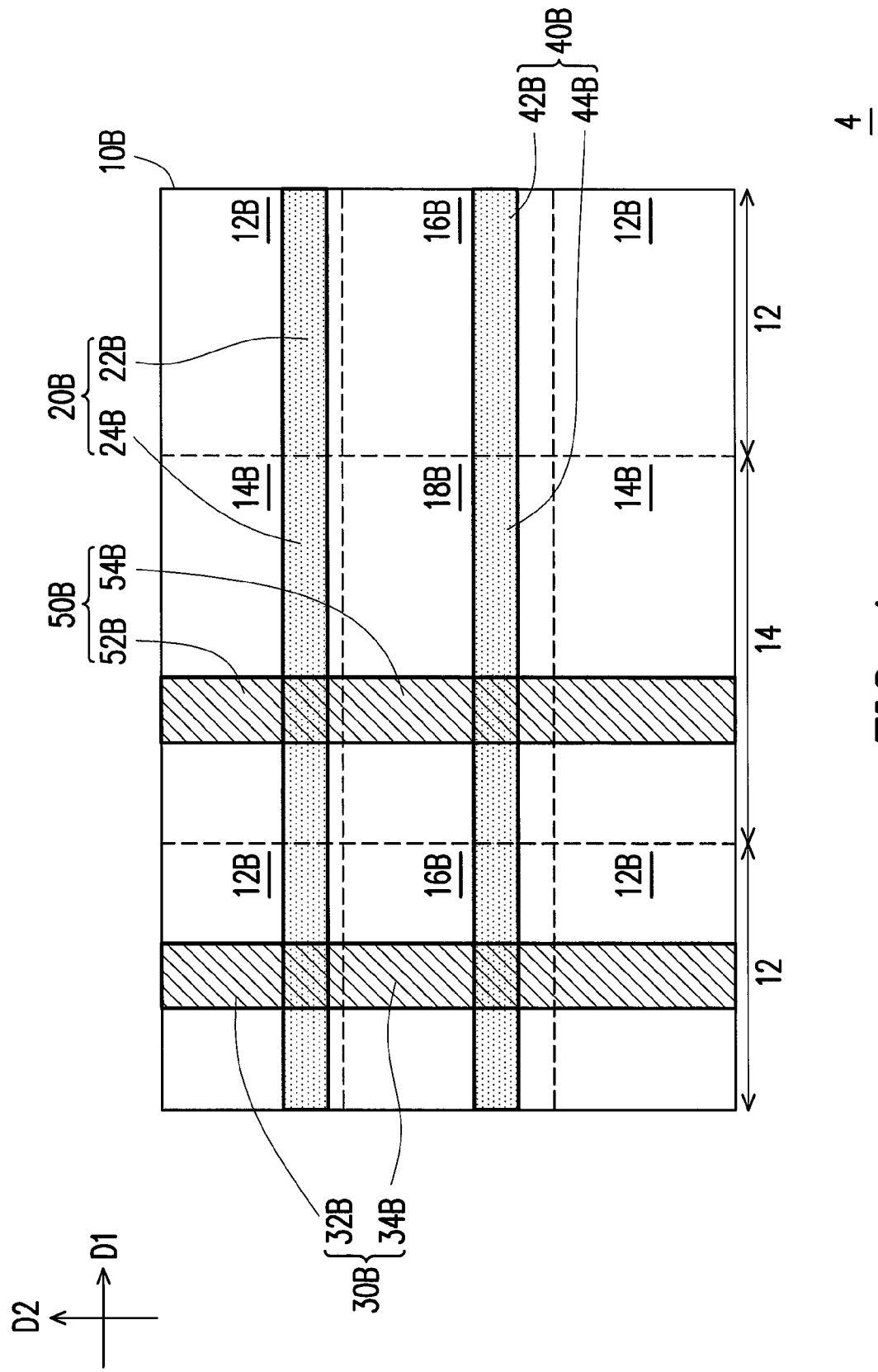
FIG. 4 is a schematic diagram illustrating a touch panel according to an embodiment.

FIG. 4 is a schematic diagram illustrating a touch panel according to an embodiment. Referring to FIG. 4, the touch panel 4 includes a substrate 10B, at least one first sensing series 20B, at least one second sensing series 30B, at least one third sensing series 40B and at least one fourth sensing series 50B. The substrate 10B, for example, has at least one first sensing region 12B, at least one second sensing region 14B, at least one third sensing region 16B and at least one fourth sensing region 18B. The first sensing series 20B, the second sensing series 30B, the third sensing series 40B and the fourth sensing series 50B are all disposed on the substrate 10B.

The first sensing region 12B is adjacent to the second sensing region 14B in a first direction D1, and adjacent to the third sensing region 16B in a second direction D2. The second sensing region 14B is adjacent to the fourth sensing region 18B in the second direction D2. The third sensing region 16B is adjacent to the fourth sensing region 18B in the first direction D1.

Each first sensing series 20B extends along the first direction D1 and includes a first-first sensing portion 22B located in the first sensing region 12B and a second-first sensing portion 24B located in the second sensing region 14B. A pattern of the first-first sensing portion 22B is different from a pattern of the second-first sensing portion 24B. Herein, different patterns are referring to the difference in at least one of the design parameters such as linewidth, profile, thickness, laminated structure or so forth. In other words, the first sensing series 20B is constituted of two different units. In the following, different patterns also represent the similar concept.

Each second sensing series 30B extends along the second direction D2, is not electrically connected with the first sensing series 20B, and includes a first-second sensing portion 32B located in the first sensing region 12B and a third-second sensing portion 34B located in the third sensing region 16B. A pattern of the first-second sensing portion 32B is different from a pattern of the third-second sensing portion 34B.

Each third sensing series 40B extends along the first direction D1, is not electrically connected with the second sensing series 30B, and includes a third-first sensing portion 42B located in the third sensing region 16B and a fourth-first sensing portion 44B located in the fourth sensing region 18B. A pattern of the third-first sensing portion 42B is different from a pattern of the fourth-first sensing portion 44B.

Each fourth sensing series 50B extends along the second direction D2, is not electrically connected with the first sensing series 20B and the third sensing series 40B, and includes a second-second sensing portion 52B located in the second sensing region 14B and a fourth-second sensing portion 54B located in the fourth sensing region 18B. A pattern of the second-second sensing portion 52B is different from a pattern of the fourth-second sensing portion 54B.

Since a same sensing series has different patterns in different sensing regions, the touch panel 4 of the present embodiment may be designed to have several sensing regions with larger external force tolerability, so as to enhance the service life of the touch panel 4. For example, when the substrate 10B is a flexible substrate, the second sensing regions 14B, the third sensing regions 16B and the fourth sensing region 18B may be configured as predetermined regions to be bended. Now, the sensing portions located in the second sensing regions 14B, the third sensing regions 16B and the fourth sensing region 18B, as compared to the sensing portion located in the first sensing regions 12B, have larger linewidths. Or, the sensing portions located in the second sensing regions 14B, the third sensing regions 16B and the fourth sensing region 18B may have multilayer structures while the sensing portions located in the first sensing regions 12B only have a monolayer structure. Or, the sensing portions located in the second sensing regions 14B, the third sensing regions 16B and the fourth sensing region 18B may have laminated layer amounts more than that of the sensing portion located in the first sensing regions 12B. Thus, the second sensing regions 14B, the third sensing regions 16B and the fourth sensing region 18B may bear larger bending stress, such that it is helpful in providing the touch panel 4 with a flexible functionality while extending the service life of the touch panel 4 at the same time.

Figure 5:
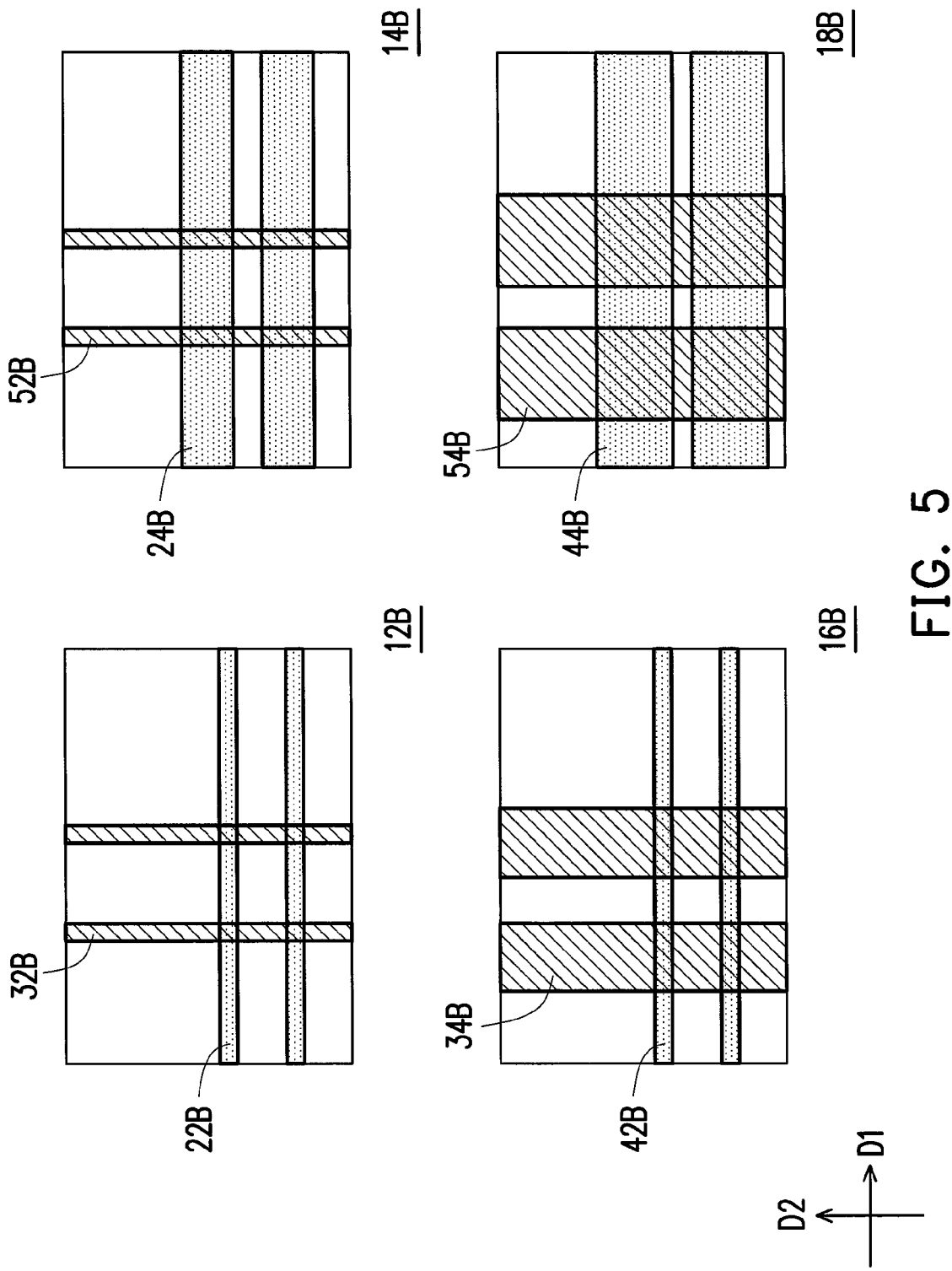
FIG. 5 is a schematic diagram illustrating sensing portions of a first sensing region, a second sensing region, a third sensing region and a fourth sensing region in a touch panel according to an embodiment.

FIG. 5 is a schematic diagram illustrating sensing portions located at a first sensing region, a second sensing region, a third sensing region and a fourth sensing region in a touch panel according to an embodiment. Referring to FIG. 4 and FIG. 5, the substrate 10B may be bended along the first direction D1 or the second direction D2. Herein, the substrate 10B bending along the first direction D1 refers to, that the substrate 10B is bended along a bending axial direction parallel to the second direction D2 or intersected with the first direction D1.

When the substrate 10B is bended along the first direction D1, the second sensing region 14B and the fourth sensing region 18B are bearing a maximum bending stress. Now, a stress bore by the second-first sensing portions 24B located in the second sensing regions 14B extending along the first direction D1 are greater than that of the first-first sensing portions 22B located in the first sensing regions 12B extending along the first direction D1. Therefore, in terms of the first sensing series 20B, a linewidth (e.g., a minimum linewidth) of the second-first sensing portions 24B may be larger than a linewidth of the first-first sensing portions 22B. Similarly, a stress bore by the fourth-first sensing portion 44B located in the fourth sensing region 18B extending along the first direction D1 is greater than that of the third-first sensing portions 42B located in the third sensing region 16B extending along the first direction D1. Therefore, in terms of the third sensing series 40B, a linewidth (e.g., the minimum linewidth) of the fourth-first sensing portion 44B may be larger than a linewidth of the third-first sensing portions 42B.

When the substrate 10B is bended along the second direction D2, and the bending axial direction is parallel to the first direction D1 or intersected with the second direction D2, the third sensing regions 16B and the fourth sensing region 18B are bearing the maximum bending stress. Now, a stress bore by the third-second sensing portions 34B located in the third sensing region 16B extending along the second direction D2 is greater than that of the first-second sensing portions 32B located in the first sensing regions 12B extending along the second direction D2. Therefore, in terms of the second sensing series 30B, a linewidth (e.g., the minimum linewidth) of the third-second sensing portions 34B may be larger than a linewidth of the first-second sensing portions 32B. Similarly, a stress bore by the fourth-second sensing portion 54B located in the fourth sensing region 18B extending along the second direction D2 is greater than that of the second-second sensing portions 52B located in the second sensing region 14B extending along the second direction D2. Therefore, in terms of the fourth sensing series 50B, a linewidth (e.g., the minimum linewidth) of the fourth-second sensing portion 54B may be larger than a linewidth of the second-second sensing portions 52B.

Figure 6:
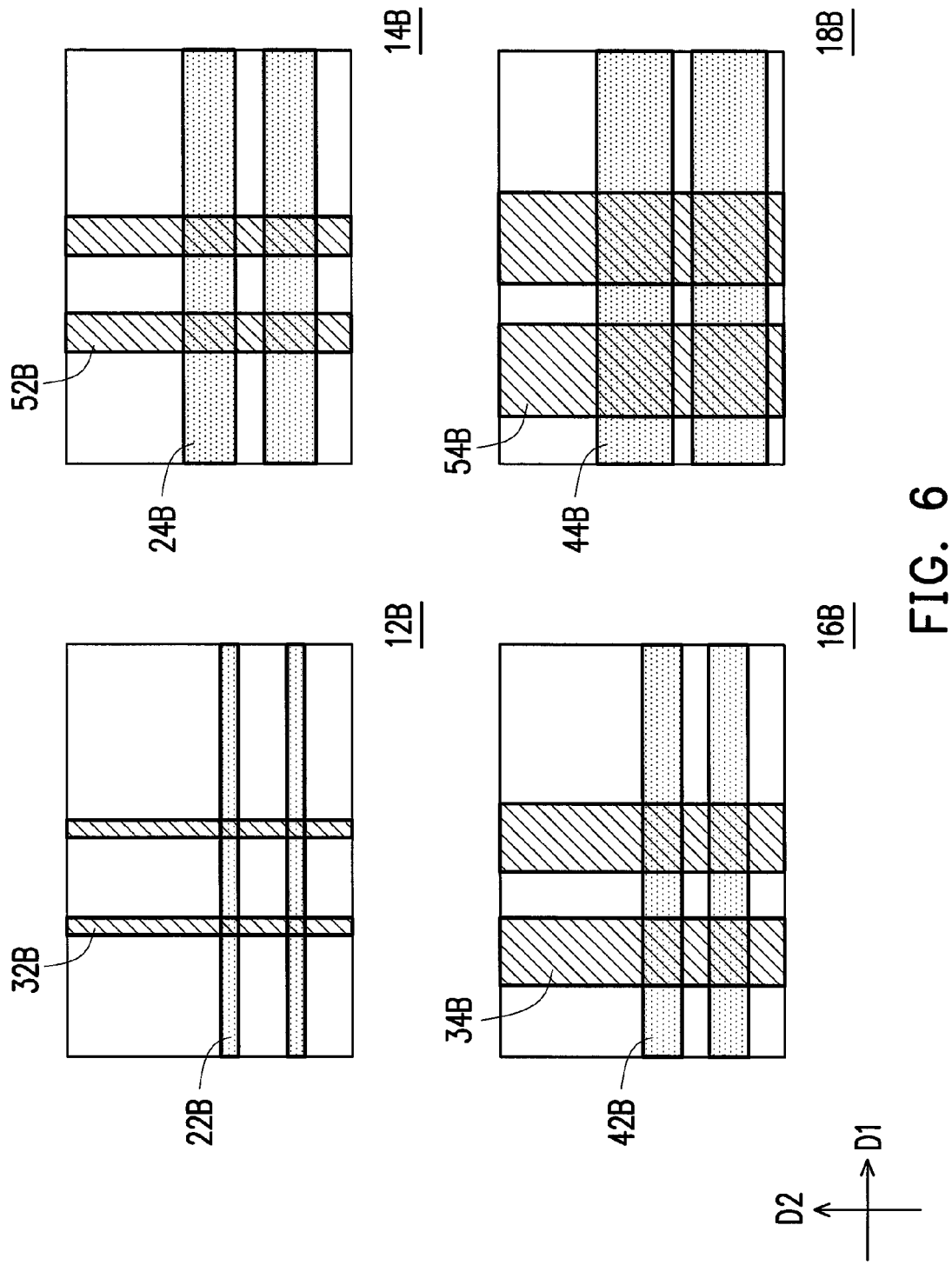
FIG. 6 is a schematic diagram illustrating sensing portions of a first sensing region, a second sensing region, a third sensing region and a fourth sensing region in a touch panel according to an embodiment.

The sensing portions located in the fourth sensing region 18B, regardless of extending along the first direction D1 or extending along the second direction D2, as compared to other sensing portions of the same series, may have a larger linewidth design. However, the disclosed embodiment is not limited thereto. FIG. 6 is a schematic diagram illustrating sensing portions of a first sensing region, a second sensing region, a third sensing region and a fourth sensing region in a touch panel according to an embodiment. Referring to FIG. 4 and FIG. 6, the substrate 10B may be bended along the first direction D1 or the second direction D2. In the present embodiment, designs of the fourth sensing portion 18B and the first sensing portions 12B may be the same as the designs described in the previous embodiment illustrated in FIG. 4. Therefore, the following below is to describe the sensing portions in the second sensing region 14B and the third sensing region 16B.

In the present embodiment, the second-second sensing portion 52B located in the second sensing region 14B extending along the second direction D2, as compared to the first-second sensing portion 32B, may have an enlarged linewidth. Moreover, the third-first sensing portion 42B located in the third sensing region 16B extending along the first direction D1, as compared to the first-first sensing portion 22B, may have an enlarged linewidth. Now, tolerabilities of the second-second sensing portion 52B and the third-first sensing portion 42B against the bending stress may be enhanced, and thereby it is helpful in prolonging the service life of the touch panel 4.

Figure 7:
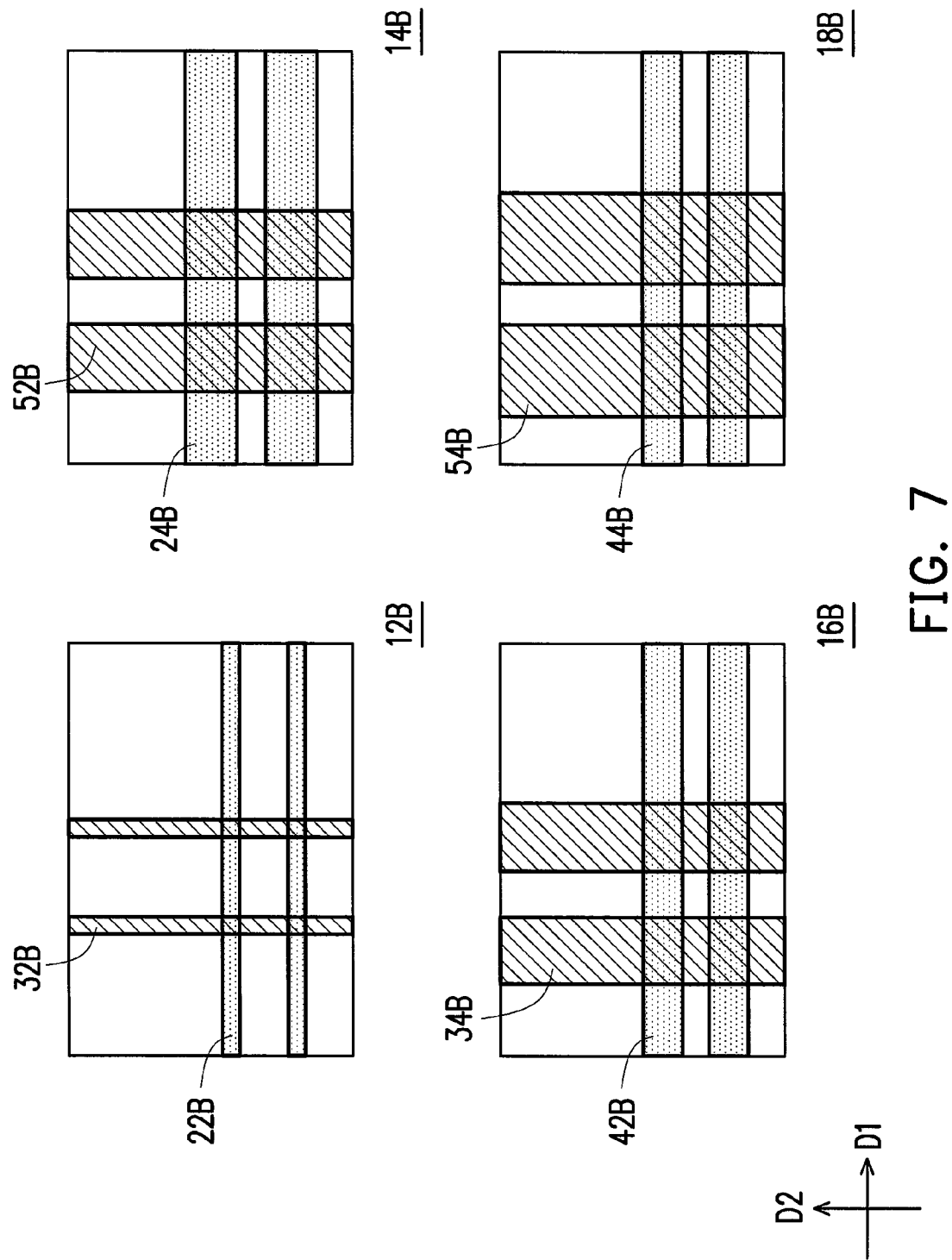
FIG. 7 is a schematic diagram illustrating sensing portions of a first sensing region, a second sensing region, a third sensing region and a fourth sensing region in a touch panel according to an embodiment.

In another embodiment, FIG. 7 is a schematic diagram illustrating sensing portions of a first sensing region, a second sensing region, a third sensing region and a fourth sensing region in a touch panel according to an embodiment. Referring to FIG. 4 and FIG. 7, the substrate 10B may be bended along the first direction D1 or the second direction D2, wherein when bended along the first direction D1, the bending axial direction may be parallel to the second direction D2, and vice versa. In the present embodiment, the sensing portions in the second sensing region 14B, the third sensing region 16B and the fourth sensing region 18B may have the same pattern design.

In the present embodiment, the second-second sensing portion 52B located in the second sensing region 14B extending along the second direction D2 and the fourth-second sensing portion 54B located in the fourth sensing region 18B extending along the second direction D2 may have the same pattern (same linewidth design). Additionally, linewidths of the second-second sensing portion 52B and the fourth-second sensing portion 54B are both larger than that of the first-second sensing portion 32B.

Moreover, the third-first sensing portion 42B located in the third sensing region 16B extending along the first direction D1 and the fourth-first sensing portion 44B located in the fourth sensing region 18B extending along the first direction D1 may also have the same pattern (linewidth design). Furthermore, linewidths of the third-first sensing portion 42B and the fourth-first sensing portion 44B are both larger than that of the first-first sensing portion 22B.

The embodiment design described above mainly enables the components in the first sensing region to have at least one of a pattern, a laminated layer number, or a material different from that of the components in the other sensing regions, so that the components in the first sensing region have properties different from the components in the other sensing regions. As a result, the first sensing region and the other sensing regions may have different bending endurances, and it is helpful in applications of flexible devices. The following below illustrates the layout design of each sensing series. However, the following descriptions are not intended for limiting the disclosed embodiment. In other embodiments, appearance, laminated layer and layout designs of the components of each sensing series may be modified along with different needs.

Figure 8:
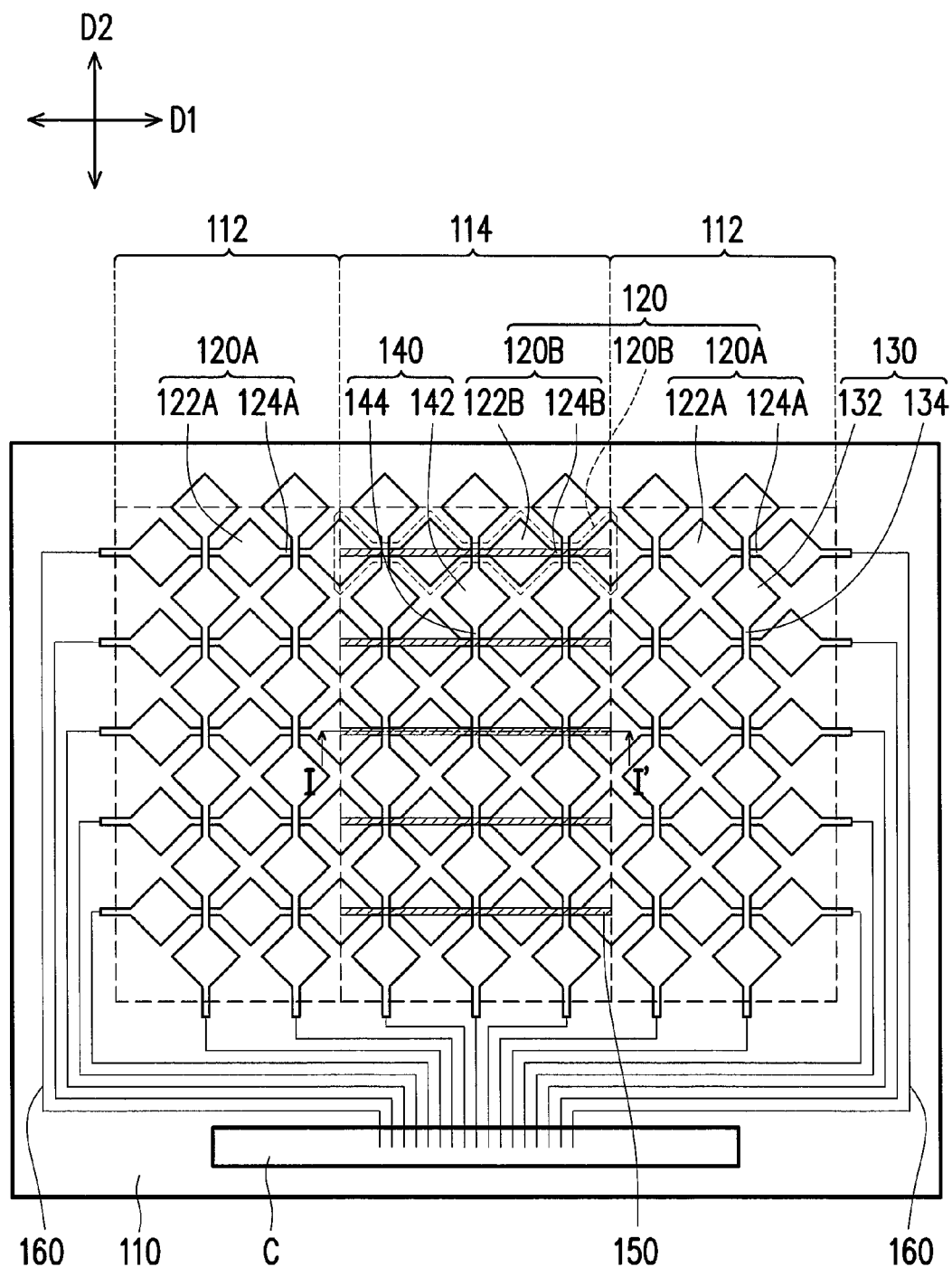
FIG. 8 is a top view diagram schematically illustrating a touch panel according to an embodiment.
Figure 9:
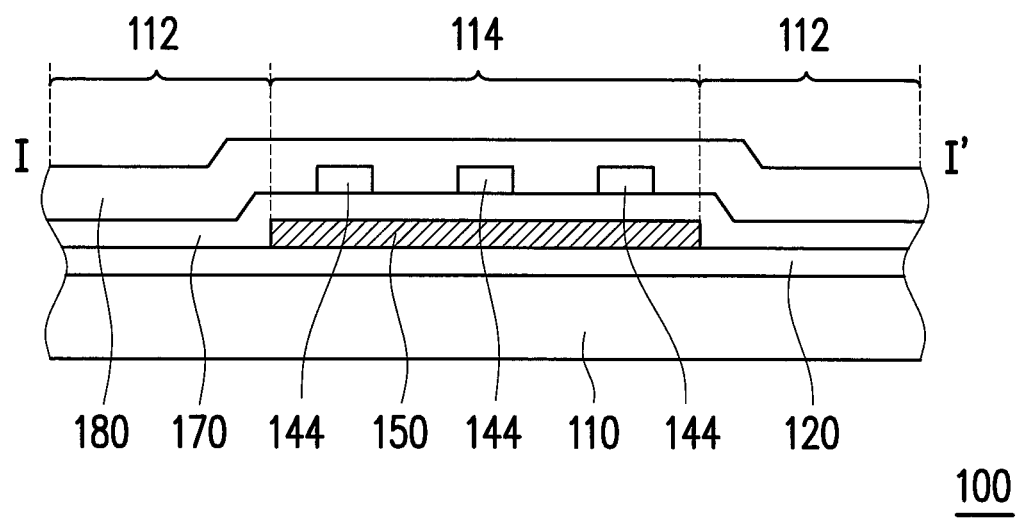
FIG. 9 is a cross-sectional view schematically illustrating the touch panel in FIG. 8 along a profile line I-I'.

FIG. 8 is a top view diagram schematically illustrating a touch panel according to an embodiment, and FIG. 9 is a cross-sectional view schematically illustrating the touch panel in FIG. 8 along a profile line I-I'. Referring to FIG. 8, a touch panel 100 includes a substrate 110, at least one first sensing series 120, at least one second sensing series 130, at least one third sensing series 140 and at least one linear conductor 150. Generally, in order to enable the touch panel 100 to perform a touch sensing operation, the touch panel 100 is connected to a control circuit C. The control circuit C may be disposed in a control chip, and the control chip may be directly bonded on the substrate 110, or the control chip may be connected to the touch panel 100 via a circuit board. Moreover, the control circuit C for controlling the touch panel 100 may also be disposed on other external components (e.g. an electronic host device), and thereby connect the touch panel together with the electronic host device via the circuit board. Therefore, FIG. 8 only schematically illustrates the control circuit C, and the present embodiment is not intended to limit implementations of the control circuit C disposed on the substrate 110.

The substrate 110 has at least one first sensing region 112 and at least one second sensing region 114. The first sensing regions 112 and the at least one second sensing region 114 are alternatively arranged in a first direction D, so that the at least one second sensing region 114 is disposed between the first sensing regions 112. The substrate 110 of the present embodiment, for example, is divided into two first sensing regions 112 and one second sensing region 114, wherein the second sensing region 114 is disposed between the two first sensing regions 112. Moreover, an arrangement of these sensing regions is a first sensing region 112, a second sensing region 114 following by another first sensing region 112 sequentially arranged along the first direction D1. In an embodiment, when the substrate 110 is a flexible substrate, a material thereof is, for example, glass or polymeric material such as polyethylene terephthalate (PET) or polycarbonate (PC). When the substrate 110 is the flexible substrate, the touch panel 100 has a property of flexibility and may be applied to flexible products.

The first sensing series 120 are disposed on the substrate 110. Each first sensing series 120 extends along the first direction D1 and includes at least one first-first sensing portion 120A respectively located in first sensing region 112 and at least one second-first sensing portion 120B located in the second sensing region 114. In other words, each first sensing series 120 is traversing all the sensing regions, such that the first sensing region 112 and the second sensing region 114 may both have a touch sensing effect.

A portion of each first sensing series 120 disposed in the first sensing region 112 is namely the first-first sensing portion 120A, and a portion of each first sensing series 120 located in the second sensing region 114 is namely the second-first sensing portion 120B. Since the substrate 110 of the present embodiment has been divided into two first sensing regions 112 and one second sensing region 114, each first sensing series 120 may include two first-first sensing portions 120A and one second-first sensing portion 120B, and the second-first sensing portion 120B is disposed between the two first-first sensing portions 120A. In other embodiments, when an amount of the first sensing region 112 is different from an amount of the second sensing region 114, an amount of first-first sensing portion 120A and an amount of the second-first sensing portion 120B would also change accordingly.

The second sensing series 130 are disposed on the substrate 110 and located in the first sensing regions 112. Each second sensing series 130 extends in a second direction D2 intersecting with the first direction D1 and is intersected with the first-first sensing portions 120A of the first sensing series 120. Moreover, the third sensing series 140 are disposed on the substrate 110 and located in the at least one second sensing region 114. Each third sensing series 140 extends along the second direction D2 and is intersected with the second-first sensing portion 120B of the first sensing series 120. In other words, sensing electrodes with an extending direction parallel to the second direction D2 may be defined as the second sensing series 130 and the third sensing series 140 according to different disposing locations thereof. However, the second sensing series 130 and the third sensing series 140 may selectively have the same pattern, the same material, or both the same pattern and material, substantially. Certainly, the disclosed embodiment is not limited thereto, and in other embodiments, the second sensing series 130 and the third sensing series 140 may be sensing electrodes having different patterns and materials.

In the present embodiment, the sensing electrodes are implemented in series. Therefore, the first-first sensing portions 120A of each first sensing series 120, for example, include at least one first-first sensing pad 122A and at least one first-first neck tightening portion 124A connecting together these first-first sensing pads 122A in series. The second-first sensing portion 120B of each first sensing series 120, for example, includes at least one second-first sensing pad 122B and at least one second-first neck tightening portion 124B connecting together these second-first sensing pads 122B in series. The first-first sensing pads 122A and the second-first sensing pads 122B may have the same shape and area size, and the first-first neck tightening portions 124A and the second-first neck tightening portions 124B may also have the same type and area size. In other words, each first sensing series 120 is substantially formed by connecting at least one sensing pad having the same shape and area in series through at least one neck tightening portion having the same linewidth. Moreover, each second sensing series 130 is also formed by connecting at least one sensing pad 132 having the same shape and area in series through at least one neck tightening portion 134 having the same linewidth. Furthermore, each third sensing series 140 is also formed by connecting at least one sensing pad 142 having the same shape and area in series through at least one neck tightening portion 144 having the same linewidth. However, the present embodiment is not limited to the sensing electrodes with the serial form design. In other embodiments, each sensing series may be replaced with a strip-shaped electrode, or each sensing pad of the sensing series may have a geometrical shape such as circular, triangular, rectangular, hexagonal, octagonal or so forth.

When the substrate 110 is a flexible substrate, the touch panel 100 may be bended during the duration of use. In an embodiment, the second sensing region 114 may be designed as a location of a bending axis when the touch panel 110 is bended, and two first sensing regions 112 under a bending state may be facing towards or backwards to each other. In other words, when the touch panel 100 is in a bending state, a radius of curvature of the second sensing region 114 is, for example, smaller than a radius of curvature of the first sensing regions 112. Now, the second-first sensing portion 120B of the first sensing series 120 may be disconnected or increased in impedance due to a bending stress. In particular, the second-first neck tightening portions 124B are the portions in the second-first sensing portion 120B with the minimum linewidth, and thus are more easily to be disconnected or increased in impedance.

Therefore, as shown in FIG. 8 and FIG. 9, the linear conductors 150 of the present embodiment are disposed on the second-first sensing portions 120B of the first sensing series 120. Moreover, an insulating layer 170 is disposed between the linear conductors 150 and the neck tightening portions 144 of the third sensing series 140, and a protective layer 180 is disposed on the touch panel 100 to cover the first sensing series 120, the second sensing series 130 and the third sensing series 140. Each linear conductor 150 is substantially connected between two adjacent first sensing regions 112. Each linear conductor 150 transverses the second sensing region 114, and two ends of each linear conductor 150 may be respectively located on boundaries of the second sensing region 114 and the first sensing regions 112. In addition, the linear conductors 150 are respectively in contact with the corresponding third-second sensing portion 120B. As a result, the linear conductors 150 may enhance the bending endurance of the second-first sensing portion 120B, thereby avoiding the first sensing series 120 from being disconnected in the second sensing region 114 and improving the first sensing series 120 from the situation of increasing in impedance in the second sensing region 114.

In terms of the present embodiment, a material of the linear conductors 150 includes conductive polymer material, metal, nano-conductive material or a combination thereof, wherein the nano-conductive material includes at least one nanowire, at least one nano-conductive particle or at least one carbon nanotube, and the conductive polymer material, for example, includes PDOT: PPS. The metal material generally does not have a light transmittancy, and therefore, in order to enable the entire touch panel 100 to have a light transmittancy, the linewidths of the linear conductors 150 that are selected to be manufactured with the metal material may be selectively reduced to a width below human eye differentiation, such as less than 30 microns. The conductive polymer material and the nano-conductive material have a certain amount of transmittancy in general; and therefore when adopting those materials to manufacture the linewidths of the linear conductors 150, the linewidths of the linear conductors 150 may be free from the width limitation of human eye differentiation. Although, in the present embodiment, the linear conductors 150 are described in a linear shape, but the disclosed embodiment is not limited thereto. In other embodiments, under a premise that the entire touch panel 100 has a transmittance nature, the linear conductors 150 may selectively be in a shape identical to a serial shape of the second-first sensing portions 120B. In other words, the portion of the first sensing series 120 in the second sensing region 114 may substantially be constituted by a stack of at least two conductive layers.

Moreover, a material of the first sensing series 120, the second sensing series 130 and the third sensing series 140 includes an oxide conductive material having a transparent nature, such as an indium tin oxide or an indium zinc oxide. In other words, the material of the linear conductors 150 may be different from the material of the first sensing series 120. In addition, the material of the linear conductors 150, as compared to the material of first sensing series 120, may have a favorable ductility. When the touch panel 100 is bended, the linear conductors 150 are relatively uneasy to be damaged or broken. Furthermore, the stacking of the linear conductors 150 and the second-first sensing portion 120B increases a transmission cross-sectional area of the portion of the first sensing series 120 in the second sensing region 114. When the second sensing region 114 is bended, the portion of the first sensing series 120 in the second sensing region 114 is not prone to a phenomenon of substantial increase in impedance. Therefore, the design of the linear conductors 150 is helpful in enhancing a suitability of the touch panel 100 in the application of flexible products.

In the present embodiment, in order to enable the first-first sensing portions 120A in different first sensing regions 112 to have a consistent sensing sensitivity, the two ends of each first sensing series 120 may be respectively connected the control circuit C through corresponding transmission lines 160. As a result, even if the second-first sensing portion 120B in the second sensing region 114 is disconnected or increase in impedance due to repeatedly bending during the use, the first-first sensing portions 120A may still retain an ideal touch sensing function.

Moreover, during the process of operating the touch panel 100, at least one of the first sensing series 120 may be used as a reference series and not to provide the sensing function. For example, when the touch panel 100 is bended, the control circuit C, via a resistance value variation presented by the first sensing series 120 of reference, may determine whether the components of the second sensing region 114 (such as the second-first sensing portion 120B) has been damaged, so as to determine whether the sensing signals sensed by the other first sensing series 120 are in need of a correction. In an embodiment, an impedance ratio of first sensing series 120 of reference in between the first sensing region 112 and the second sensing region 114 may be equal to impedance ratios of the other first sensing series 120 in between the first sensing region 112 and the second sensing region 114. Now, the first sensing series 120 of reference may selectively have an appearance different from the other first sensing series 120, such that the first sensing series 120 of reference may be a long strip instead of a series.

Figure 10:
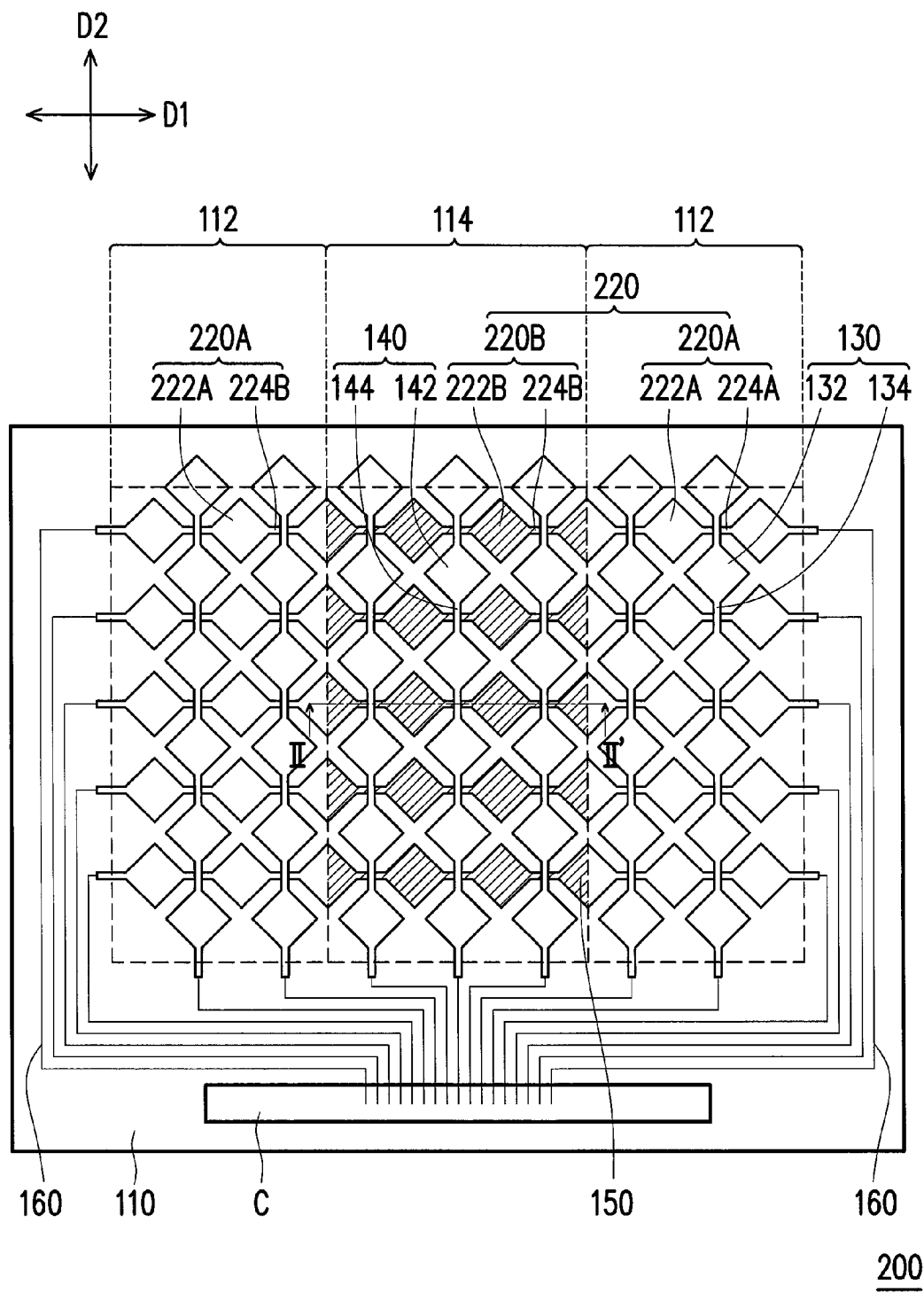
FIG. 10 is a top view diagram schematically illustrating a touch panel according to an embodiment.
Figure 11:
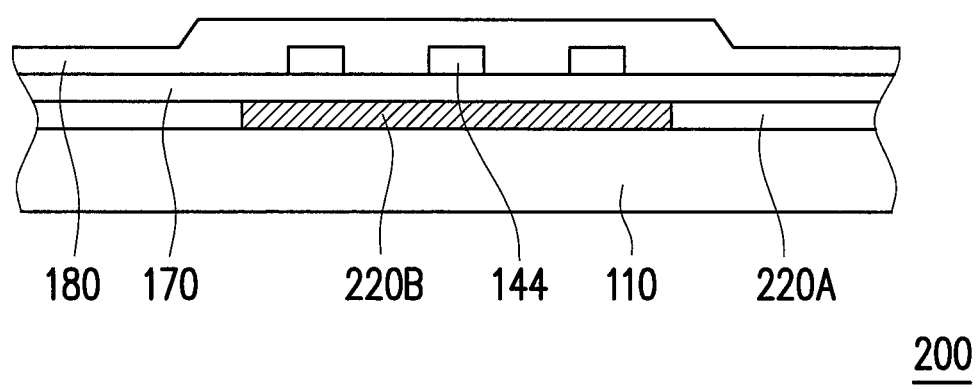
FIG. 11 is a cross-sectional view schematically illustrating the touch panel in FIG. 10 along a profile line II-II'

FIG. 10 is a top view diagram schematically illustrating a touch panel according to an embodiment, and FIG. 11 is a cross-sectional view schematically illustrating the touch panel in FIG. 10 along a profile line II-II'. Referring to FIG. 10, a touch panel 200 includes a substrate 110, at least one first sensing series 220, at least one second sensing series 130 and at least one third sensing series 140, wherein the substrate 110, the second sensing series 130 and the third sensing series 140 all have designs similar to that of the embodiment illustrated in FIG. 8; and therefore, detail descriptions of these similar components may be referred back to the embodiment illustrated in FIG. 8, and are not to be repeated herein.

The present embodiment is different from the embodiment illustrated in FIG. 8 in designs of the components in the second sensing region. In the touch panel 200, the first-first sensing portions 220A of each first sensing series 220 have a material different from that of the second-first sensing portion 220B. In other words, as shown in FIG. 11, each first sensing series 220 is manufactured by at least two different materials, wherein the material of each first sensing series 220 in the first sensing region 112 is different from the material in the second sensing region 114.

The first-first sensing pads 222A and the first-first neck tightening portions 224A of the first-first sensing portions 220A may be manufactured with a conductive metal oxide material, and the second-first sensing pads 222B and the second-first neck tightening portions 224B of the second-first sensing portion 220B may be manufactured with a conductive polymer material, a nano-conductive material or a combination thereof, wherein the nano-conductive material includes at least one nanowire, at least one nano-conductive particle or at least one carbon nanotube. According to the characteristics of the materials, the second-first sensing portion 220B, as compared to the first-first sensing portions 220A, may have a favorable ductility. Therefore, when the touch panel 200 is bended, the second-first sensing portion 220B may bear greater stress without being easily damaged. In other words, when the touch panel 200 is in a bending state, the second sensing region 114 may be regarded as a bending axis, so that a radius of curvature of the second sensing region 114, for example, is smaller than a radius of curvature of the first sensing region 112. Now, the second-first sensing portion 220B, due to a material thereof, has the favorable ductility and is not easily to be disconnected. Namely, the second sensing region 114 may still normally provide a touch sensing function under greater bending stress.

In the second sensing region 114 of the touch panel 200, the linear conductors 150 illustrated in FIG. 8 may selectively be not required to be disposed. However, the disclosed embodiment is not limited thereto, in other embodiments, a bending tolerability of the second sensing region 114 may also be further strengthened via disposing the linear conductos 150 illustrated in FIG. 8 on the second-first sensing portion 220B located in the second sensing region 114. Moreover, when disposing the linear conductors 150 illustrated in FIG. 8 on the second-first sensing portion 220B, a material of the linear conductors 150 may be the same as or different from a material of the second-first sensing portion 220B. In addition, as described by the embodiment illustrate in FIG. 8, at least one of the first sensing series 220 may be used as the reference series during the operation of the touch panel 200 and not to provide the sensing function.

Figure 12:
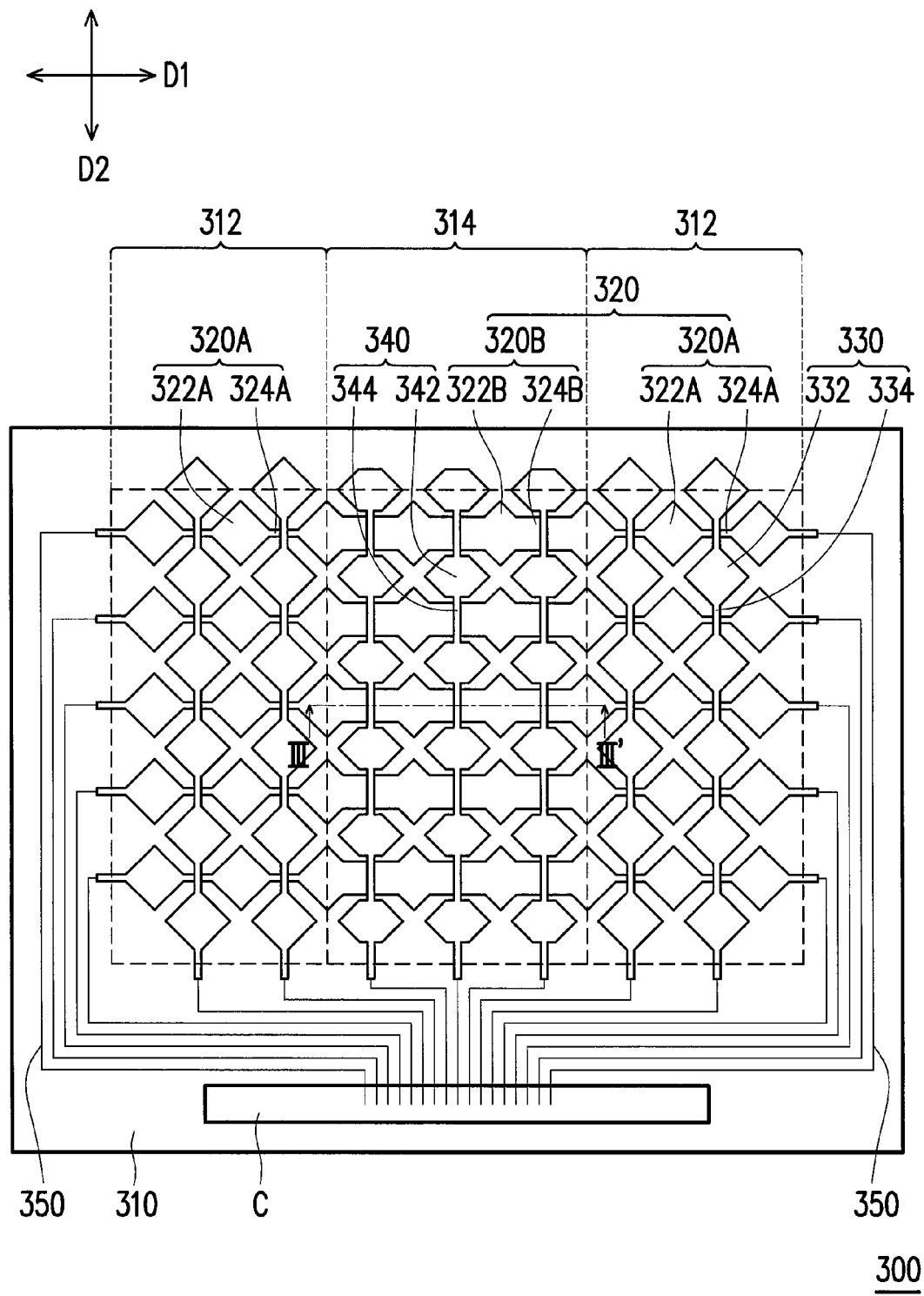
FIG. 12 is a top view diagram schematically illustrating a touch panel according to an embodiment.
Figure 13:
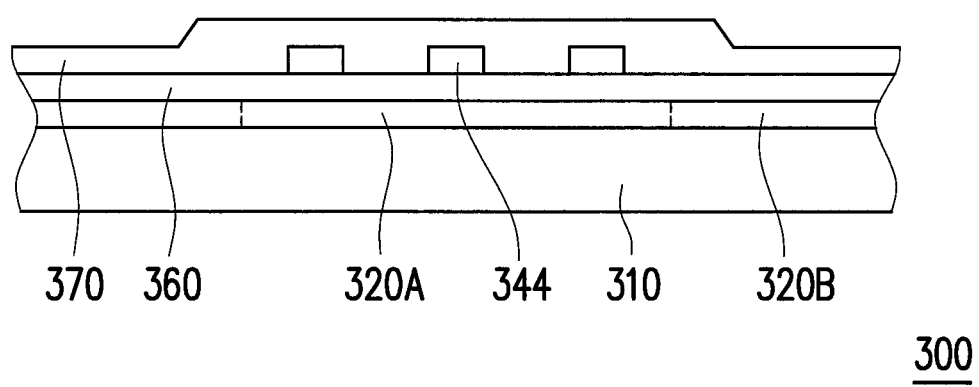
FIG. 13 is a cross-sectional view schematically illustrating the touch panel in FIG. 12 along a profile line III-III'.

In the above-mentioned embodiment, the sensing electrodes in the first sensing region 112 and the second sensing region 114 have similar patterns as observed from a top view diagram, but the disclosed embodiment is not limited thereto. FIG. 12 is a top view diagram schematically illustrating a touch panel according to an embodiment, and FIG. 13 is a cross-sectional view schematically illustrating the touch panel in FIG. 12 along a profile line . Referring to FIG. 12, a touch panel 300 includes a substrate 310, at least one first sensing series 320, at least one second sensing series 330 and at least one third sensing series 340. Similar to the previous embodiments, the touch panel 300 is connected to a control circuit C, wherein the control circuit C may be disposed according the descriptions described in the embodiment illustrated in FIG. 8, and thus is not to be repeated herein. Furthermore, two ends of each first sensing series 320 may respectively be connected to the control circuit C through corresponding transmission lines 350.

In the present embodiment, the substrate 310, similar to the previous embodiments, has at least one first sensing region 312 and at least one second sensing region 314. The first sensing series 320 are disposed on the substrate 310. Each first sensing series 320 extends along a first direction D1 and includes at least one first-first sensing portion 320A respectively located in the first sensing region 312 and at least one second-first sensing portion 320B located in the second sensing region 314. The second sensing series 330 are disposed on the substrate 310 and located in the first sensing regions 312. Each second sensing series 330 extends along a second direction D2 intersecting with the first direction D1 and is intersected with the first-first sensing portions 320A of the first sensing series 320. Each second sensing series 330 is a series constituted of at least one sensing pad 332 and at least one neck tightening portion 334, and extending along second direction D2. Moreover, the third sensing series 340 are disposed on the substrate 310 and located in at least one second sensing region 314. Each third sensing series 340 is a series constituted of at least one sensing pad 342 and at least one neck tightening portion 344, extending along a second direction D2, and intersecting with the second-first sensing portion 320B of the first sensing series 120. In other words, the sensing electrodes with an extending direction parallel to the second direction D2, according to the different disposing locations thereof, may be defined as the second sensing series 130 and the third sensing series 340.

A portion of each first sensing series 320 disposed in the first sensing region 312 is namely the first-first sensing portion 320A, and a portion of each first sensing series 320 located in the second sensing region 314 is namely the second-first sensing portion 320B. Since the substrate 310 has been divided into two first sensing regions 312 and one second sensing region 314, each first sensing series 320 may include two first-first sensing portions 320A and one second-first sensing portion 320B, and the second-first sensing portion 320B is disposed between the two first-first sensing portions 320A. In addition, a minimum linewidth W1 of the second sensing portion 320B is different from a minimum linewidth W2 of the first-first sensing portions 320A.

The first-first sensing portions 320A of each first sensing series 320 include at least one first-first sensing pad 322A and at least one first-first neck tightening portion 324A connecting together the first-first sensing pads 322A in series along the first direction D1, and the second-first sensing portion 320B of the first sensing series 320 includes at lest one second-first sensing pad 322B and at least one second-first neck tightening portion 324B connecting together the second-first sensing pads 322B in series along the first direction D1. Under this serial pattern design, linewidths of the second-first neck tightening portions 324B are namely the minimum linewidths W1 of the second sensing portions 320B, and linewidths of the first-first neck tightening portions 324A are namely the minimum linewidths W2 of the first-first sensing portions 320A. Consequently, the linewidths of the second-first neck tightening portions 324B are larger than the linewidths of the first-first neck tightening portions 324A.

In the present embodiment, the second-first sensing portion 320B, as compared to the first-first sensing portions 320A, has the wider neck tightening portions. Now, a bearable bending stress of the second-first sensing portion 320B is, for example, greater than that of the first-first sensing portions 320A; namely, the second-first sensing portion 320B, as compared to the first-first sensing portions 320A, have a favorable bending tolerability. The touch panel 300 may adopt the second sensing region 114, which has the favorable bending tolerability, as a bending axis when is applied to the flexible products. As a result, the first sensing series 320 is not easily to be disconnected or damaged due to bending during a duration of use. In other words, when the touch panel 300 is applied to the flexible products, since the second sensing region 114 is configured as the bending axis, the second sensing region 114 may have a radius of curvature smaller than that of the first sensing region 112.

The second-first neck tightening portions 324B of the second-first sensing portion 320B has a widened linewidth design; namely, the minimum linewidth W1 is larger than the minimum linewidth W2 of the first-first sensing portions 320A. Therefore, the second-first sensing portion 320B, even though having a material identical to a material of the first-first sensing portions 320A, may still provide the favorable bending tolerability in the second sensing region 114. Consequently, as shown in FIG. 12, the second-first sensing portion 320B and the first-first sensing portion 320A may be manufactured by adopting the same film layer; namely, the two have the same material. Now, an insulating layer 360 may be disposed between the first sensing series 320 and the third sensing series 340 to separate the two apart, and a protective layer 370 may be disposed on a surface of the touch panel 300 to cover the first sensing series 320, the second sensing series 330 and the third sensing series 340.

Figure 14:
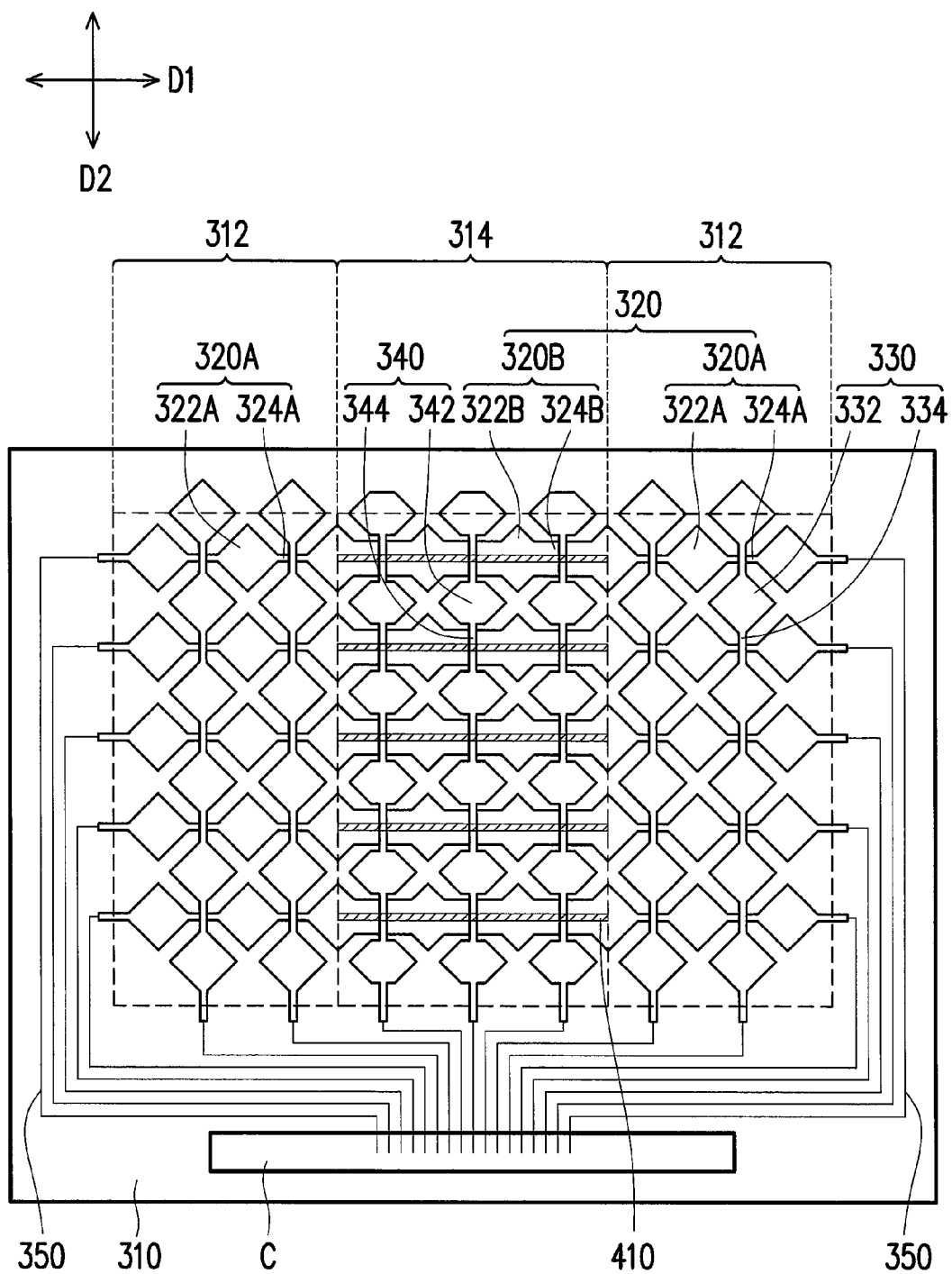
FIG. 14 is a top view diagram schematically illustrating a touch panel according to an embodiment.

It may be known from the embodiment illustrated in FIG. 8, by using another conductive material to manufacture a linear conductor in contact with the second-first sensing portions 320B of the first sensing series 320, it may be helpful in enhancing the bending tolerability of the second-first sensing portions 320B. Hence, FIG. 14 is a top view diagram schematically illustrating a touch panel according to an embodiment. Referring to FIG. 14, a touch panel 400 has all the components of the touch panel 300, and further includes at least one linear conductor 410. In other words, the linear conductor 410 may be selectively disposed on each second-first sensing portion 320B, such that the linear conductor 410 is in contact with the corresponding second-first sensing portion 320B, and thus a service life of the touch panel 400 is further enhanced. Certainly, as it is described in the embodiment illustrated in FIG. 8, the linear conductor 410 may have a linear pattern or a pattern identical to that of the second-first sensing portions 320B as when observed from a top view diagram.

Furthermore, a material of the linear conductor 410 may be the same as a material of first sensing series 320 or different from a material of the first sensing series 320. For example, the material of the linear conductor 410 includes conductive polymer material, metal, nano-conductive material or a combination thereof.

Figure 15:
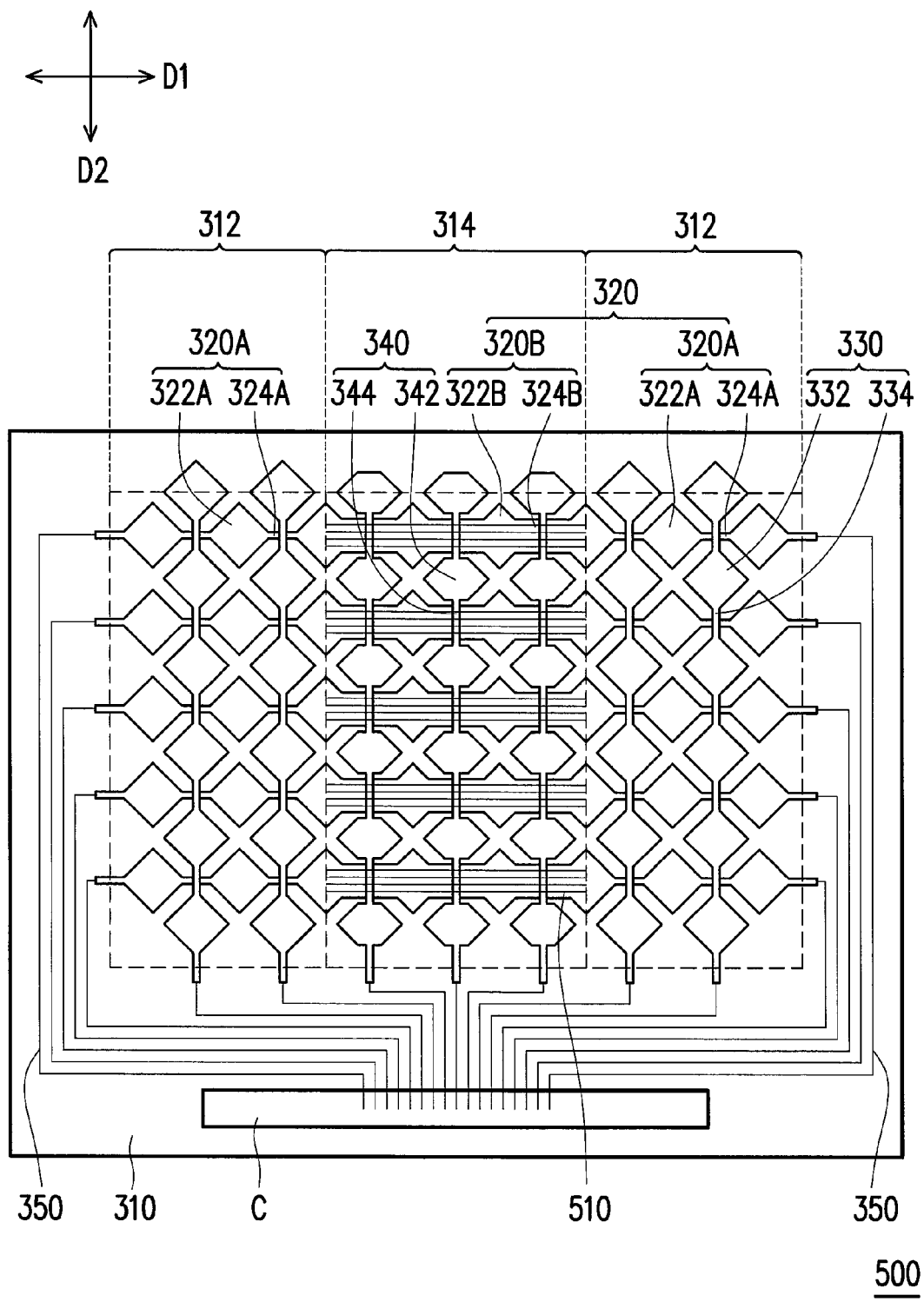
FIG. 15 is a top view diagram schematically illustrating a touch panel according to an embodiment.

Moreover, FIG. 15 is a top view diagram schematically illustrating a touch panel according to an embodiment. Referring to FIG. 15, a touch panel 500 is substantially constituted of the touch panel 300 in addition with at least one linear conductor 510. The linear conductors 510 are disposed on the second-first sensing portion 320B of the first sensing series 320, and each linear conductor 510 extends along the first direction D1 and connects between two adjacent first sensing regions 112. Now, the second-first sensing portion 320B has a laminated structure different from that of the first-first sensing portions 320A due to the configuration of the linear conductors 510. The linewidth of the first-first neck tightening portions 324A in the first-first sensing portions 320A is, for example, several hundred microns, and the linewidths of the second-first neck tightening portions 324B in the second-first sensing portion 320B are much larger. Therefore, at least one linear conductor 510 may be disposed on the same second-first sensing portion 320B in the present embodiment, wherein a linewidth of the linear conductor 510 may be several tens of microns, such as less than 30 microns. Now, the linear conductors 510 may be a silver conductive wires or wires composed of other metal materials, but still not easily seen by users.

Figure 16:
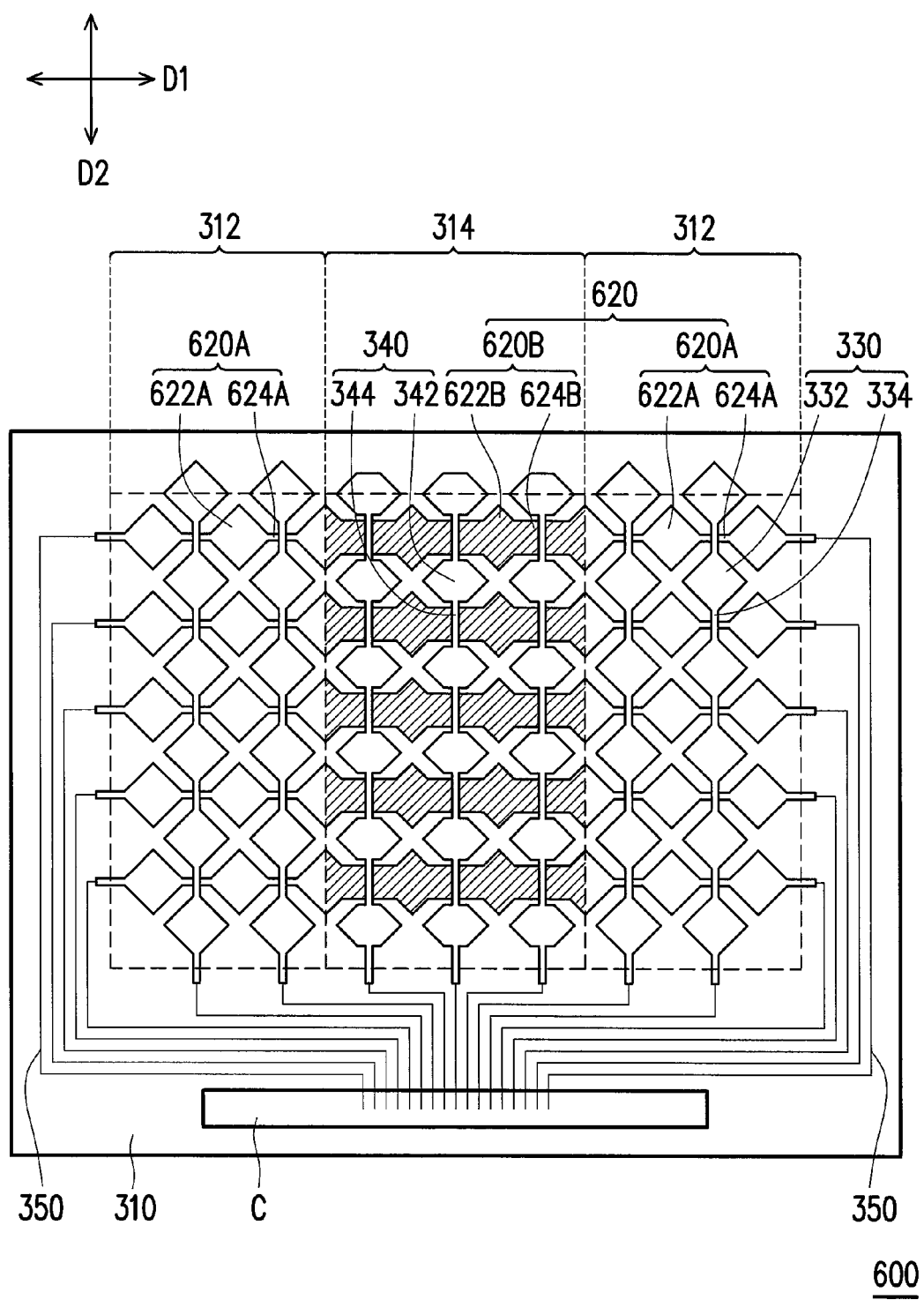
FIG. 16 is a top view diagram schematically illustrating a touch panel according to an embodiment.

FIG. 16 is a top view diagram schematically illustrating a touch panel according to an embodiment. Referring to FIG. 16, a touch panel 600 includes a substrate 310, at least one first sensing series 620, at least one second sensing series 330 and at least one third sensing series 340, wherein configurations and designs of the substrate 310, the second sensing series 330 and the third sensing series 340 may be referred back to the detail descriptions descried in the embodiment illustrated in FIG. 12, and thus are not to be repeated herein. Same as the previous embodiments, the touch panel 600 is connected to a control circuit C. A difference between the present embodiment and the embodiment illustrated in FIG. 12 is that, each first sensing series 620 includes a first-first sensing portions 620A and a second-first sensing portion 620B, wherein a material of the first-first sensing portions 620A is different from a material of the second-first sensing portion 620B.

Each first sensing series 620 is manufactured with at least two different materials, wherein a material of each first sensing series 620 in the first sensing region 312 is different from a material in the second sensing region 314. At least one first-first sensing pad 622A and at least one first-first neck tightening portion 624A of the first-first sensing portion 620A may be manufactured with a conductive metal oxide material, and at least one second-first sensing pad 622B and at least one second-first neck tightening portion 624B of the second-first sensing portion 620B may be manufactured with a conductive polymer material, a nano-conductive material or a combination thereof, wherein the nano-conductive material includes at least one nanowire, at least one nano-conductive particle or at least one carbon nanotube.

According to characteristics of the materials, the second-first sensing portion 620B, as compared to the first-first sensing portion 620A, may have a favorable ductility. Therefore, when the touch panel 600 is bended, the second-first sensing portion 620B is able to bear a greater stress without being easily damaged. In other words, when the touch panel 600 is in a bending state, the second sensing region 314 may be regarded as a bending axis, so that a radius of curvature of the second sensing region 314 is, for example, smaller than a radius of curvature of the first sensing region 312. Now, the second-first sensing portion 620B, due to the material thereof, has the favorable ductility and is not easily disconnected. Namely, the second sensing region 314 may still normally provide a touch sensing function under greater bending stress. Moreover, at least one linear conductor in contact with the second-first sensing portion 642B may also be selectively disposed on the second sensing region 314 of the touch panel 600, so as to enhance bending tolerabilities of the components in the second sensing region 314.

When the touch panel 600 is bended, since the second sensing region 314 may be regarded as the bending axis, the third sensing series 340 located in the second sensing region 314 is also subjected to the bending stress. Therefore, the third sensing series 340 may also substantially be manufactured by adopting a conductive material with favorable ductility, or the third sensing series 340 may be constituted by stacking at least one conductive layer. However, a width of the third sensing series 340 in the first direction D1 is smaller, and the third sensing series 340 may substantially be parallel to the bending axis. Now, the third sensing series 340, as compared to the second-first sensing portion 620B, is not easily to be disconnected due to bending stress. Thus, the material of the third sensing series 340 may also selectively be the same as the materials of the first-first sensing portions 620A and the second sensing series 330, substantially.

The bending axis mentioned in the above embodiments illustrated in FIG. 8 to FIG. 16 is parallel to the second direction D2, and thus the tolerability of the second sensing region 314 against the bending stress, in the above-mentioned embodiments, is enhanced by adopting to increase the linewidths of the sensing electrodes in the second sensing regions 114, 314 or by adopting to manufacture the sensing electrodes in the second sensing regions 114, 314 using a material with a favorable ductility. The second sensing regions 114, 314 in the above-mentioned embodiments, are substantially ribbon-shaped regions parallel to the second direction D2 and provide a bending axis in one direction. However, in other embodiment, a touch panel may have two bending axes of different directions.

Figure 17:
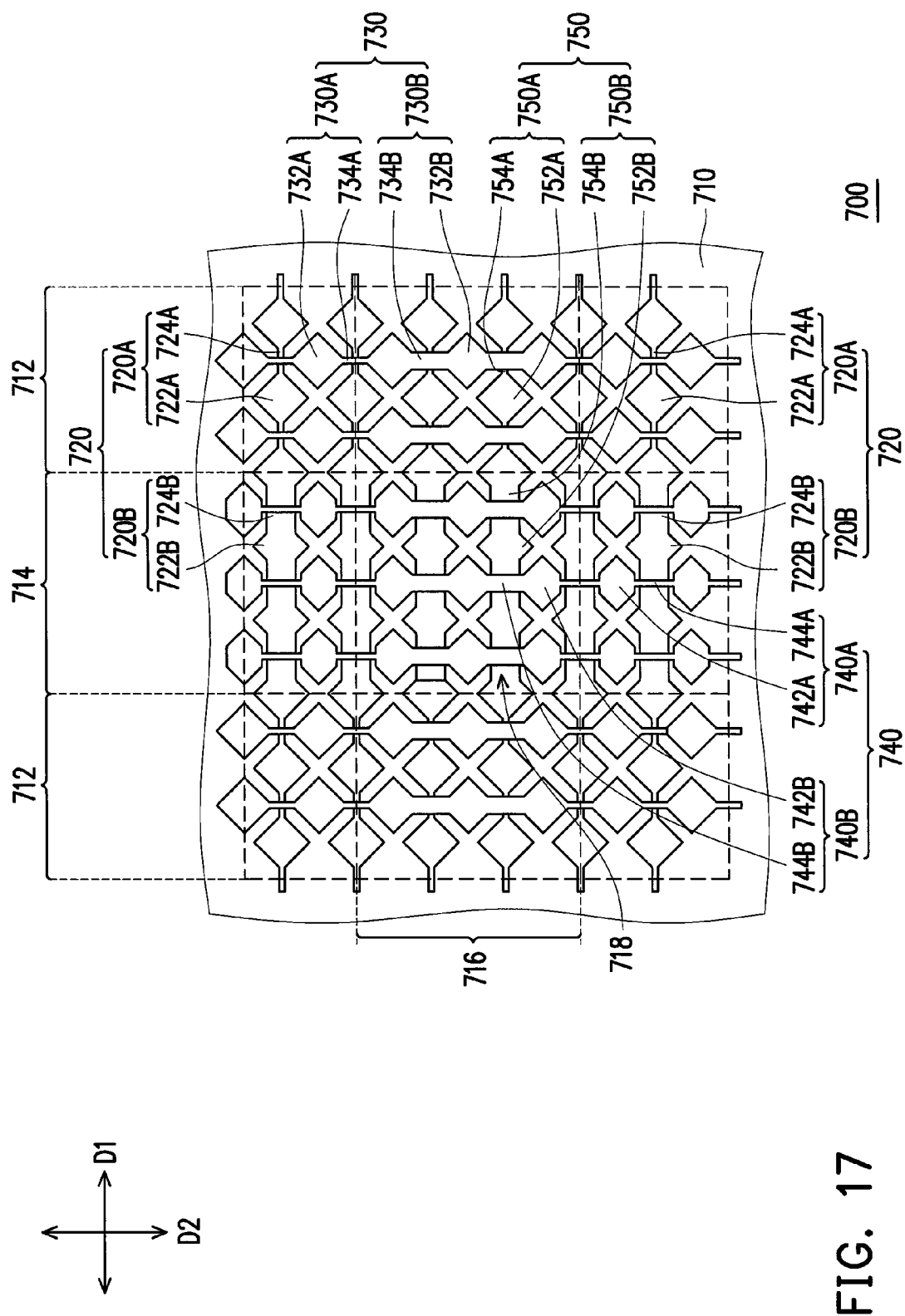
FIG. 17 is a top view diagram schematically illustrating a touch panel according to an embodiment.

For example, FIG. 17 is a top view diagram schematically illustrating a touch panel according to an embodiment. Referring to FIG. 17, a touch panel 700 includes a substrate 710, at least one first sensing series 720, at least one second sensing series 730, at least one third sensing series 740 and at least one fourth sensing series 750. FIG. 17 only schematically illustrates partial regions of the touch panel 700, and it may be know from the above-mentioned embodiments, the first sensing series 720, the second sensing series 730, the third sensing series 740 and the fourth sensing series 750 are each connected to a control circuit (not shown); moreover, two ends of each of the first sensing series 720, the second sensing series 730, the third sensing series 740 and the fourth sensing series 750 may both be connect to the control circuit. Each first sensing series 720 and each fourth sensing series 750 are, for example, parallel to a first direction D1, and each second sensing series 730 and each third sensing series 740 are, for example, parallel to a second direction D2, and a sensing electrode array is constituted on the substrate 710 with these alternatively arranged sensing series.

In the present embodiment, the substrate 710 is, for example, divided into at least one first sensing region 712, at least one second sensing region 714, at least one third sensing region 716 and a fourth sensing region 718. The first sensing region 712 and the second sensing region 714 are adjacent to each other in the first direction D1. The first sensing region 712 and the third sensing region 716 are adjacent to each other in second direction D2. The second sensing region 714 and the fourth sensing region 718 are adjacent to each other in the second direction D2, and the third sensing region 716 and the fourth sensing region 718 are adjacent to each other in the first direction D1.

Each first sensing series 720 parallel to the first direction D1 traverses the first sensing region 712 and the second sensing region 714 and includes a first-first sensing portion 720A located in the first sensing region 712 and a second-first sensing portion 720B located in the second sensing region 71. The second sensing series 730 parallel to the second direction D2 traverses the first sensing region 712 and the third sensing region 716 and includes a first-second sensing portion 730A located in the first sensing region 712 and a third-second sensing portion 720B located in the third sensing region 716. Each third sensing series 740 includes a second-second sensing portion 740A located in the second sensing region 714 and a fourth-second sensing portion 740B located in the fourth sensing region 718, wherein the second-second sensing portion 740A is intersected with the second-first sensing portion 720B. Moreover, each fourth sensing series 750 includes a third-first sensing portion 750A located in the third sensing region 716 and a fourth-first sensing portion 750B located in the fourth sensing region 718, wherein the third-first sensing portion 750A is intersected with the third-second sensing portion 730B, and the fourth-first sensing portion 750B is intersected with the fourth-second sensing portion 740B.

In the present embodiment, minimum linewidths of the second-first sensing portion 720B, the third-second sensing portion 730B, the fourth-second sensing portion 740B and the fourth-first sensing portion 750B may respectively larger than that of the first-first sensing portion 720A, the first-second sensing portion 730A, the second-second sensing portion 740A and the third-first sensing portion 750A. Or, the second-first sensing portion 720B, the third-second sensing portion 730B, the fourth-second sensing portion 740B and the fourth-first sensing portion 750B, as compared to the first-first sensing portion 720A, the first-second sensing portion 730A, the second-second sensing portion 740A and the third-first sensing portion 750A, may adopt to be formed by stacking more film layers. Or, the second-first sensing portion 720B, the third-second sensing portion 730B, the fourth-second sensing portion 740B and the fourth-first sensing portion 750B, as compared to the first-first sensing portion 720A, the first-second sensing portion 730A, the second-second sensing portion 740A and the third-first sensing portion 750A, may adopt to be manufactured with a material with a favorable ductility. As a result, the second-first sensing portion 720B, the third-second sensing portion 730B, the fourth-second sensing portion 740B and the fourth-first sensing portion 750B may be the portions in the first sensing series 720, the second sensing series 730, the third sensing series 740 and the fourth sensing series 750 which have favorable tolerabilities.

When the substrate 710 is a flexible substrate, the touch panel 700 may adopt the second sensing region 714 parallel to the second direction D2 as the bending axis or may adopt the third sensing region 716 parallel to the first direction D1 as the bending axis. In other words, the touch panel 700 may adopt different means of bending, and thus has a wider range of applications.

The sensing series of the present embodiment are all constituted of at least one sensing pad and at least one neck tightening portion connecting together these sensing series. Thus, the so-called minimum linewidths of the sensing portions may be regarded as the linewidths of the neck tightening portions. In detail, each first sensing series 720 includes a first-first sensing portion 720A constituted by at least one first-first sensing pad 722A and at least one first-first neck tightening portion 724A and a second-first sensing portion 720B constituted by at least one second-first sensing pad 722B and at least one second-first neck tightening portion 724B, wherein a linewidth of the second-first neck tightening portion 724B may be larger than a linewidth of the first-first neck tightening portion 724A. Similarly, each second sensing series 730 includes a first-second sensing portion 730A constituted by at least one first-second sensing pad 732A and at least one first-second neck tightening portion 734A and a third-second sensing portion 730B constituted by at least one third-second sensing pad 732B and at least one third-second neck tightening portion 734B, wherein a linewidth of the third-second neck tightening portion 734B is larger than a linewidth of the first-second neck tightening portion 734A. Each third sensing series 740 includes a second-second sensing portion 740A constituted by at least one second-second sensing pad 742A and at least one second-second neck tightening portion 744A and a fourth-second sensing portion 740B constituted by at least one fourth-second sensing pad 742B and at least one fourth-second neck tightening portion 744B, wherein a linewidth of the fourth-second neck tightening portion 744B is larger than a linewidth of the second-second neck tightening portion 744A. Each fourth sensing series 750 includes a third-first sensing portion 750A constituted by at least one third-first sensing pad 752A and at least one third-first neck tightening portion 754A and a fourth-first sensing portion 750B constituted by at least one fourth-first sensing pad 752B and at least one fourth-first neck tightening portion 754B, wherein a linewidth of the fourth-first neck tightening portion 754B is larger than a linewidth of the third-first neck tightening portion 754A.

In other embodiments, the first-first neck tightening portion 724A, the second-first neck tightening portion 724B, the first-second neck tightening portion 734A, the third-second neck tightening portion 734B, the second-second neck tightening portion 744A, the fourth-second neck tightening portion 744B, the third-first neck tightening portion 754A and the fourth-first neck tightening portion 754B may selectively the same linewidth. However, the second-first sensing portion 720B, the third-second sensing portion 730B, the fourth-second sensing portion 740B and the fourth-first sensing portion 750B may be selected to manufacture with materials having ductility. Certainly, for a transmittancy of the touch panel 700, the materials for manufacturing the first to the fourth sensing series 720-750 may be selected to use transparent conductive materials or to have linewidths indifferentiable by human eye.

In summary, the touch panel of the disclosed embodiments has a variety of sensing regions, wherein at least a portion of the sensing electrodes in one of the sensing regions is manufactured using a material with a favorable ductility, has a larger linewidth, or has more laminated layer number. Therefore, this portion of the sensing electrodes would not be easily damaged due to the touch panel being bended. This sensing region of the sensing electrodes which has larger bending tolerability is disposed in the touch panel, and may be used as a bending axis when the touch panel is bended. As a result, the touch panel in the disclosed embodiments may be applied to the flexible products, and would not be easily damaged due to bending in the duration of use. Moreover, in the touch panel of the disclosed embodiments, when each of the sensing series constituted by the sensing electrodes traverses the predetermined bending axis, the two ends of each of the sensing series may respectively connect to the control circuit. Consequently, it may ensure that the sensing electrodes at both sides of the bending axis have a consistent sensing sensitivity. Hence, the touch panel of the disclosed embodiments also has a favorable sensing quality under the bending state.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch panel comprising:
a substrate having at least one first sensing region and at least one second sensing region, the at least one second sensing region being continuously extending from a side of the substrate to another side opposite to the side and the first sensing region and the second sensing region being alternatively arranged in a first direction, wherein when the substrate is in a bending state with a bending axial direction parallel to a second direction, a radius of curvature of the at least one second sensing region is smaller than a radius of curvature of the at least one first sensing region and the second direction is intersected with the first direction;
at least one first sensing series disposed on the substrate, each first sensing series extending along the first direction and comprising at least one first-first sensing portion located in the first sensing region and at least one second-first sensing portion located in the second sensing region;
at least one second sensing series disposed on the substrate, each second sensing series extending along the second direction and comprising at least one first-second sensing portion located in the first sensing region, wherein the second sensing series and the first sensing series are not electrically connected; and
at least one third sensing series disposed on the substrate, each third sensing series extending along the second direction and comprising a second-second sensing portion located in the second sensing region, wherein the third sensing series and the first sensing series are not electrically connected, and a pattern of the first-first sensing portion is different from a pattern of the second-first sensing portion.

2. The touch panel as recited in claim 1, wherein a pattern of the first-second sensing portion is different from a pattern of the second-second sensing portion.

3. The touch panel as recited in claim 1, wherein a material of at least one of the first-first sensing portion, the second-first sensing portion, the first-second sensing portion and the second-second sensing portion comprises organic conductive material, inorganic conductive material or a combination thereof.

4. The touch panel as recited in claim 3, wherein the inorganic conductive material comprises a metal oxide or a metal, and the inorganic conductive material has a sheet structure, a line structure, a rod-like structure, a reticular structure or a granular structure.

5. The touch panel as recited in claim 3, wherein the organic conductive material comprises a conductive polymer, a nano carbon material or a grapheme, and the organic conductive material has a sheet structure, line structure, a rod-like structure, a reticular structure or a granular structure.

6. The touch panel as recited in claim 1, wherein materials of at least two of the first-first sensing portion, the first-second sensing portion, the second-first sensing portion and the second-second sensing portion are different.

7. The touch panel as recited in claim 1, wherein laminated layer numbers of at least two of the first-first sensing portion, the first-second sensing portion, the second-first sensing portion and the second-second sensing portion are different.

8. The touch panel as recited in claim 1, wherein the first-first sensing portion and the second-first sensing portion adjacent thereto are electrically connected in series along the first direction.

9. The touch panel as recited in claim 1, wherein the substrate is a flexible substrate.

10. The touch panel as recited in claim 1, wherein:
the substrate further comprises at least one third sensing region and at least one fourth sensing region, wherein the first sensing region is adjacent to the second sensing region in the first direction and is adjacent to the third sensing region located in the second direction, the second sensing region is adjacent to the fourth sensing region in the second direction, the third sensing region is adjacent to the fourth sensing region located in the first direction;
the at least one second sensing series further comprises a third-second sensing portion located in the third sensing region;
the at least one third sensing series further comprises a fourth-second sensing portion located in the fourth sensing region; and
the touch panel further comprises at least one fourth sensing series disposed on the substrate, each fourth sensing series extending along the first direction, not electrically connected with the second sensing series, and comprising a third-first sensing portion located in the third sensing region and a fourth-first sensing portion located in the fourth sensing region.

11. The touch panel as recited in claim 10, wherein the pattern of the first-first sensing portion is different from a pattern of at least one of the third-first sensing portion and the fourth-first sensing portion.

12. The touch panel as recited in claim 10, wherein patterns of at least two of the second-first sensing portion, the third-first sensing portion and the fourth-first sensing portion are different.

13. The touch panel as recited in claim 10, wherein patterns of at least two of the first-second sensing portion, the second-second sensing portion, the third-second sensing portion and the fourth-second sensing portion are different.

14. The touch panel as recited in claim 10, wherein the third-first sensing portion and the fourth-first sensing portion adjacent thereto are electrically connected in series along the first direction.

15. The touch panel as recited in claim 10, wherein the first-second sensing portion and the third-second sensing portion adjacent thereto are electrically connected in series along the second direction.

16. The touch panel as recited in claim 10, wherein second-second sensing portion and the fourth-second sensing portion adjacent thereto are electrically connected in series along the second direction.

17. The touch panel as recited in claim 10, wherein laminated layer numbers of at least two of the first-first sensing portion, the second-first sensing portion, the third-first sensing portion, the fourth-first sensing portion, the first-second sensing portion, the second-second sensing portion, the third-second sensing portion, and the fourth-second sensing portion are different.

18. The touch panel as recited in claim 10, wherein materials of at least two of the first-first sensing portion, the second-first sensing portion, the third-first sensing portion, the fourth-first sensing portion, the first-second sensing portion, the second-second sensing portion, the third-second sensing portion and the fourth-second sensing portion are different.

19. The touch panel as recited in claim 10, wherein a material of at least one of the first-first sensing portion, the first-second sensing portion, the second-first sensing portion, the second-second sensing portion, the third-first sensing portion, the third-second sensing portion, the fourth-first sensing portion and the fourth-second sensing portion comprises organic conductive material, inorganic conductive material or a combination thereof.

20. The touch panel as recited in claim 19, wherein the inorganic conductive material comprises a metal oxide or a metal, and the inorganic conductive material has a sheet structure, a line structure, a rod-like structure, a reticular structure or a granular structure.

21. The touch panel as recited in claim 19, wherein the organic conductive material comprises a conductive polymer, a nano carbon material or a grapheme, and the organic conductive material has a sheet structure, line structure, a rod-like structure, a reticular structure or a granular structure.

22. A touch panel comprising:
a substrate having at least one first sensing region and at least one second sensing region, the at least one second sensing region being continuously extending from a side of the substrate to another side opposite to the side and the first sensing region and the second sensing region being alternatively arranged in a first direction, wherein when the substrate is in a bending state with a bending axial direction parallel to a second direction, a radius of curvature of the at least one second sensing region is smaller than a radius of curvature of the at least one first sensing region and the second direction is intersected with the first direction;
at least one first sensing series disposed on the substrate, the first sensing series extending along the first direction and comprising at least one first-first sensing portion located in the first sensing region and at least one second-first sensing portion located in the second sensing region;
at least one second sensing series disposed on the substrate, the second sensing series extending along the second direction, not electrically connected with the first sensing series, and comprising a first-second sensing portion located in the first sensing region; and
at least one third sensing series disposed on the substrate, the third sensing series extending along the second direction, not electrically connected with the first sensing series, and comprising a second-second sensing portion located in the second sensing region, wherein a material of at least one of the first-first sensing portion and the first-second sensing portion is different from a material of at least one of the second-first sensing portion and the second-second sensing portion.

23. The touch panel as recited in claim 22, wherein the first-first sensing portion and the second-first sensing portion adjacent thereto are electrically connected in series along the first direction.

24. The touch panel as recited in claim 22, wherein a material of at least one of the first-first sensing portion, the first-second sensing portion, the second-first sensing portion and the second-second sensing portion comprises organic conductive material, inorganic conductive material or a combination thereof.

25. The touch panel as recited in claim 24, wherein the inorganic conductive material comprises a metal oxide or a metal, and the inorganic conductive material has a sheet structure, a line structure, a rod-like structure, a reticular structure or a granular structure.

26. The touch panel as recited in claim 24, wherein the organic conductive material comprises a conductive polymer, a nano carbon material or a grapheme, and the organic conductive material has a sheet structure, line structure, a rod-like structure, a reticular structure or a granular structure.

27. The touch panel as recited in claim 22, wherein laminated layer numbers of at least two of the first-first sensing portion, the second-first sensing portion, the first-second sensing portion and the second-second sensing portion are different.

28. The touch panel as recited in claim 22, wherein a pattern of the first-second sensing portion and a pattern of the second-second sensing portion are different.

29. The touch panel as recited in claim 22, wherein the substrate is a flexible substrate.

30. The touch panel as recited in claim 22, wherein:
the substrate further comprising at least one third sensing region and at least one fourth sensing region, wherein the first sensing region is adjacent to the second sensing region in the first direction and is adjacent to the third sensing region in the second direction, the second sensing region is adjacent to the fourth sensing region in the second direction, the third sensing region is adjacent to the fourth sensing region in the first direction;
the at least one second sensing series further comprises a third-second sensing portion located in the third sensing region;
the at least one third sensing series further comprises a fourth-second sensing portion located in the fourth sensing region; and
the touch panel further comprises at least one fourth sensing series disposed on the substrate, each fourth sensing series extending along the first direction, not electrically connected with the second sensing series, and comprising a third-first sensing portion located in the third sensing region and a fourth-first sensing portion located in the fourth sensing region.

31. The touch panel as recited in claim 30, wherein patterns of at least two of the first-first sensing portion, the third-first sensing portion and the fourth-first sensing portion are different.

32. The touch panel as recited in claim 30, wherein patterns of at least two of the second-first sensing portion, the third-first sensing portion and the fourth-first sensing portion are different.

33. The touch panel as recited in claim 30, wherein patterns of at least two of the first-second sensing portion, the third-second sensing portion and the fourth-second sensing portion are different.

34. The touch panel as recited in claim 30, wherein patterns of at least two of the second-second sensing portion, the third-second sensing portion and the fourth-second sensing portion are different.

35. The touch panel as recited in claim 30, wherein a material of at least one of the first-first sensing portion and the first-second sensing portion is different from a material of at least one of the third-first sensing portion, the fourth-first sensing portion, the third-second sensing portion and the fourth-second sensing portion.

36. The touch panel as recited in claim 30, wherein a material of at least one of the second-first sensing portion and the second-second sensing portion is
different from a material of at least one of the third-first sensing portion, the fourth-first sensing portion, the third-second sensing portion and the fourth-second sensing portion.

37. The touch panel as recited in claim 30, wherein laminated layer numbers of at least two of the first-first sensing portion, the second-first sensing portion, the third-first sensing portion, the fourth-first sensing portion, the first-second sensing portion, the second-second sensing portion, the third-second sensing portion and the fourth-second sensing portion are different.

38. A touch panel comprising:
a substrate having at least one first sensing region and at least one second sensing region, the at least one second sensing region being continuously extending from a side of the substrate to another side opposite to the side and the first sensing region and the second sensing region being alternatively arranged in a first direction, wherein when the substrate is in a bending state with a bending axial direction parallel to a second direction, a radius of curvature of the at least one second sensing region is smaller than a radius of curvature of the at least one first sensing region and the second direction is intersected with the first direction;
at least one first sensing series disposed on the substrate, the first sensing series extending along the first direction and comprising at least one first-first sensing portion located in the first sensing region and at least one second-first sensing portion located in the second sensing region;
at least one second sensing series disposed on the substrate, the second sensing series extending along the second direction, not electrically connected with the first sensing series, and comprising a first-second sensing portion located in the first sensing region; and
at least one third sensing series disposed on the substrate, the third sensing series extending along the second direction, not electrically connected with the first sensing series, and comprising a second-second sensing portion located in the second sensing region, wherein a laminated layer number of at least one of the first-first sensing portion and the first-second sensing portion is different from a laminated layer number of at least one of the second-first sensing portion and the second-second sensing portion.

39. The touch panel as recited in claim 38, wherein the first-first sensing portion and the second-first sensing portion adjacent thereto are electrically connected in series in the first direction.

40. The touch panel as recited in claim 39, wherein:
the substrate comprises at least one third sensing region and at least one fourth sensing region, wherein the first sensing region is adjacent to the second sensing region in the first direction and is adjacent to the third sensing region in the second direction, the second sensing region is adjacent to the fourth sensing region in the second direction, the third sensing region is adjacent to the fourth sensing region in the first direction;
the at least one second sensing series further comprises a third-second sensing portion located in the third sensing region;
the at least one third sensing series further comprises a fourth-second sensing portion located in the fourth sensing region; and
the touch panel further comprises at least one fourth sensing series disposed on the substrate, each fourth sensing series extending along the first direction, not connected with the second sensing series, and comprising a third-first sensing portion located in the third sensing region and a fourth-first sensing portion located in the fourth sensing region.

41. The touch panel as recited in claim 40, wherein a laminated layer number of at least one of the first-first sensing portion and the first-second sensing portion is different from a laminated layer number of at least one of the third-first sensing portion, the fourth-first sensing portion, the third-second sensing portion and the fourth-second sensing portion.

42. The touch panel as recited in claim 40, wherein a laminated layer number of at least one of the second-first sensing portion and the second-second sensing portion is different from a laminated layer number of at least one of the third-first sensing portion, the fourth-first sensing portion, the third-second sensing portion and the fourth-second sensing portion.

43. The touch panel as recited in claim 40, wherein a pattern of the first-first sensing portion is different from a pattern of at least one of the third-first sensing portion and the fourth-first sensing portion.

44. The touch panel as recited in claim 40, wherein a pattern of the second-first sensing portion is different from a pattern of at least one of the third-first sensing portion and the fourth-first sensing portion.

45. The touch panel as recited in claim 40, wherein a pattern of the first-second sensing portion is different from a pattern of at least one of the third-second sensing portion and the fourth-second sensing portion.

46. The touch panel as recited in claim 40, wherein a pattern of the second-second sensing portion is different from a pattern of at least one of the third-second sensing portion and the fourth-second sensing portion.

47. The touch panel as recited in claim 40, wherein a material of the first-first sensing portion and the first-second sensing portion is different from a material of at least one of the third-first sensing portion, the fourth-first sensing portion, the third-second sensing portion and the fourth-second sensing portion.

48. The touch panel as recited in claim 40, wherein a material of the second-first sensing portion and the second-second sensing portion is different from a material of at least one of the third-first sensing portion, the fourth-first sensing portion, the third-second sensing portion and the fourth-second sensing portion.

* * * * *